United States Patent
Daidzic

(10) Patent No.: US 10,202,204 B1
(45) Date of Patent: Feb. 12, 2019

(54) AIRCRAFT-RUNWAY TOTAL ENERGY MEASUREMENT, MONITORING, MANAGING, SAFETY, AND CONTROL SYSTEM AND METHOD

(71) Applicant: AAR Aerospace Consulting, LLC, Saint Peter, MN (US)

(72) Inventor: Nihad E. Daidzic, Saint Peter, MN (US)

(73) Assignee: AAR Aerospace Consulting, LLC, Saint Peter, MN (US)

( * ) Notice: Subject to any disclaimer, the term of this patent is extended or adjusted under 35 U.S.C. 154(b) by 0 days.

(21) Appl. No.: 15/469,519

(22) Filed: Mar. 25, 2017

Related U.S. Application Data

(60) Provisional application No. 62/313,628, filed on Mar. 25, 2016.

(51) Int. Cl.
*B64C 5/02* (2006.01)
*B64F 1/18* (2006.01)
(Continued)

(52) U.S. Cl.
CPC ............... *B64D 45/08* (2013.01); *B64C 5/02* (2013.01); *B64C 25/10* (2013.01); *B64D 45/00* (2013.01);
(Continued)

(58) Field of Classification Search
CPC ...... B64D 45/08; G08G 5/0065; G01C 23/00; B64F 1/18; B64C 25/42
See application file for complete search history.

(56) References Cited

U.S. PATENT DOCUMENTS 3,077,110 A 2/1963 Gold
3,128,445 A 4/1964 Hosford
(Continued)

FOREIGN PATENT DOCUMENTS

WO WO_2002097764 12/2002

OTHER PUBLICATIONS

Daidzic, Nihad E., "T/O overruns and veer-offs on slippery runways with crosswind", "Professional Pilot", 2013, pp. 54-58, vol. 47, No. 8.
(Continued)

*Primary Examiner* — Michael J Zanelli
(74) *Attorney, Agent, or Firm* — Charles A. Lemaire; Jonathan M. Rixen; Lemaire Patent Law Firm, P.L.L.C.

(57) ABSTRACT

A total runway safety system (TRSS) and method measures, monitors, manages, and informs flight crew on the progress of takeoffs and landings and of any hazardous runway conditions. In some embodiments, the TRSS measures, monitors, and informs flight crew of longitudinal and lateral runway tracks thus preventing overruns and veer-offs during takeoffs and landings. In some embodiments, backscatter of infrared laser beams emitted by the aircraft is used to evaluate groundspeed and the reflectivity of the runway surface to make estimates of the surface conditions, roughness and contamination, which affects rolling and braking efforts and acceleration. In some embodiments TRSS evaluates runway surface and predicts tire-surface rolling and braking coefficient of friction. In some embodiments, GPS and similar navigation data, and ATC/airport reported runway braking conditions are evaluated along with the infrared laser, ultrasound and digital images to find best estimates of the runway remaining, current speed, acceleration, and jerk.

20 Claims, 27 Drawing Sheets

(51) Int. Cl.
  *G08G 5/00* (2006.01)
  *B64C 25/10* (2006.01)
  *B64C 25/42* (2006.01)
  *B64D 45/00* (2006.01)
  *B64D 45/06* (2006.01)
  *B64D 45/08* (2006.01)
  *G01C 23/00* (2006.01)

(52) U.S. Cl.
  CPC ............... *B64D 45/06* (2013.01); *B64F 1/18* (2013.01); *G01C 23/00* (2013.01); *G08G 5/0065* (2013.01); *B64C 25/42* (2013.01); *B64D 2045/0085* (2013.01); *B64D 2045/0095* (2013.01)

(56) References Cited

U.S. PATENT DOCUMENTS

| | | | |
|---|---|---|---|
| 4,130,015 A | 12/1978 | Grover | |
| 4,638,437 A | 1/1987 | Cleary et al. | |
| 5,353,022 A | 10/1994 | Middleton et al. | |
| 5,499,025 A | 3/1996 | Middleton et al. | |
| 9,008,873 B1* | 4/2015 | Phillips | B64D 45/08 303/126 |
| 9,082,301 B2* | 7/2015 | Catalfamo | G08G 5/02 |
| 9,483,952 B2* | 11/2016 | Chew | G06T 7/0008 |
| 9,663,223 B1* | 5/2017 | Harrison | B64C 19/00 |
| 2017/0158177 A1* | 6/2017 | Sharma | B60T 8/1703 |

OTHER PUBLICATIONS

Daidzic, Nihad E., "Improving airplane touchdown control by utilizing the adverse elevator effect, International Journal of Aviation Aeronautics and Aerospace", "International Journal of Aviation, Aeronautics, and Aerospace", Oct. 23, 2014, pp. 1-32, vol. 1, No. 4.

Daidzic, Nihad E., "A total-energy based model of airplane overspeed takeoffs. International Journal of Aviation Aeronautics and Aerospace", "International Journal of Aviation, Aeronautics, and Aerospace", Aug. 1, 2014, pp. 1-25, vol. 1, No. 3.

Daidzic, Nihad E., "Efficient general computational method for estimation of standard atmosphere parameters", "International Journal of Aviation, Aeronautics, and Aerospace", Mar. 1, 2015, pp. 1-37, vol. 2, No. 1.

Daidzic, Nihad E., et al., "Airplane Landing Performance on Contaminated Runways in Adverse Conditions", "Journal of Aircraft", Nov.-Dec. 2008, pp. 2131-2144, vol. 45, No. 6.

* cited by examiner

FIG. 1C

166 — OUTPUT PNR WARNINGS, LATERAL AND LONGITUDINAL TRACKS, AND THE LIKE

OUTPUT PREDICTION AND RECONSTRUCTION OF LANDING AND TAKEOFF LIKELY FUTURE HISTORY, THUS PROVIDING CREW WITH THE BEST INFORMATION POSSIBLE OF LIKELY EVENTS. FOR EXAMPLE, THE IMPORTANT OPERATIONAL CONDITION OF REJECTED LANDING PNR CAN BE ESTIMATED WITH THE HIGH CONFIDENCE AS THE FUTURE ACCELERATIONS, SPEEDS AND DISTANCES ARE ALSO CALCULATED TO HIGH ACCURACY. TRSS AIRCRAFT AND RUNWAY-BASED SENSORS (IF INSTALLED) PROVIDE ACCURATE INFORMATION ABOUT THE CURRENT LOCATION OF THE AIRCRAFT ON THE RUNWAY WITH ASSOCIATED LATERAL AND LONGITUDINAL SPEEDS AND ACCELERATIONS THUS PREDICTING LIKELY FUTURE LATERAL AND LONGITUDINAL TRACKS AND ASSOCIATED TOTAL DYNAMIC ENERGIES. SINCE THE TRSS MONITORS AND MANAGES SUCH TRACKS IN REAL-TIME, TIMELY AUDIO-VISUAL WARNINGS AND RECOMMENDATIONS ARE PROVIDED TO THE FLIGHT CREW FOR APPROPRIATE ACTION. TRSS CAN ALSO ASSUME FULL CONTROL.

167 — TAKE CONTROL OF EMERGENCY ACTUATORS

IN THE CASE OF EMERGENCY SITUATION AND WHEN THE HUMAN PERFORMANCE IS NOT ADEQUATE FOR THE SEVERITY OF THE SITUATION, THE TRSS CAN BE GIVEN THE FULL-AUTHORITY TO APPLY CORRECTIVE ACTIONS NECESSARY TO KEEP THE OCCUPANTS AND THE PROPERTY AS SAFE AS POSSIBLE. THE TRSS WILL IN SUCH CASES ASSUME FULL CONTROL OF AN AIRCRAFT BY APPLYING OR RELEASING FRICTION BRAKES, DEPLOYING OR RETRACTING THE LIFT-DUMP SYSTEM, THRUST-REVERSERS OR FULL FORWARD THRUST, NOSE-WHEEL STEERING INPUTS, AND PROPER FLIGHT CONTROLS APPLICATIONS (E.G., RUDDER) WITH THE GOAL TO OBTAIN MAXIMUM AND TIMELY PERFORMANCE LEVELS THEREBY ELIMINATING AND/OR MINIMIZING LIKELIHOOD OF ACCIDENTS/INCIDENTS AND NEGATIVE CONSEQUENCES IN GENERAL.

AIRCRAFT-RUNWAY TOTAL ENERGY MEASUREMENT, MONITORING, MANAGING, SAFETY, AND CONTROL SYSTEM AND METHOD

CROSS-REFERENCE TO RELATED APPLICATIONS

This application claims priority benefit, under 35 U.S.C. § 119(e), of U.S. Provisional Patent Application No. 62/313,628, filed Mar. 25, 2016, which is incorporated herein by reference in its entirety.

FIELD OF THE INVENTION

The invention is related to the field of aircraft, and more specifically to a comprehensive method and apparatus for commercial transport-category airplanes, airline operations, and aviation safety, and in particular, providing increased safety by measuring, monitoring, managing and controlling airplane runway operations, which include takeoffs and landings, and all related maneuvers.

BACKGROUND OF THE INVENTION

U.S. Pat. No. 3,077,110 issued to Theodore Gold on Feb. 12, 1963 with the title "SYSTEM FOR MONITORING THE TAKE-OFF PERFORMANCE OF AN AIRCRAFT" and is incorporated herein by reference. U.S. Pat. No. 3,077,110 describes a system for monitoring the take-off performance of an aircraft. In particular, it concerns a system for accurately providing a continuous indication of the actual performance of the aircraft during the take-off run for purposes of determining whether the aircraft will become safely airborne within the runway distance available.

U.S. Pat. No. 3,128,445 issued to Norman F. Hosford on Apr. 7, 1964 with the title "AIRCRAFT TAKE-OFF MONITORING" and is incorporated herein by reference. U.S. Pat. No. 3,128,445 describes aircraft take-off monitoring and relates particularly to methods and means for continuously presenting to aircraft pilots current facts concerning the safety of his take-off attempt.

U.S. Pat. No. 4,130,015 to Grover issued on Dec. 19, 1978 with the title "Safe take-off indicators", and is incorporated herein by reference. This patent describes an onboard take-off performance indicator system for an aircraft that includes a ground-engaging wheel which measures distance run during take-off and moves the slider of a selected one of a bank of potentiometers in response thereto. Each potentiometer is wound in accordance with a respective defined speed/distance characteristic. The selection of the potentiometer can be completely manual but is preferably in response to an electrical analogue of a graphical method which takes account of parameters individual to a particular take-off. An indication of expected speed in view of distance run is provided by the potentiometer output by means of an index on the airspeed indicator in the aircraft.

U.S. Pat. No. 4,638,437 to Cleary, et al. issued on Jan. 20, 1987 with the title "Aircraft performance margin indicator", and is incorporated herein by reference. This patent describes an aircraft performance margin indicator including a display that, during takeoff and landing, informs the pilot of the ability of the aircraft to either stop safely or achieve a safe flying speed before reaching the end of the runway is disclosed. A plurality of dedicated microprocessors, each of which receives pertinent data about the aircraft, the runway and the existing environmental conditions, produce one or more symbol control signals. The symbol control signals control the position of symbols that form part of the display. The display scale is a normalized runway and the display includes an airplane symbol that shows the location of the aircraft as the aircraft moves down the runway. The microprocessor controlled symbols include GO and STOP bugs and a ROTATE bar. The ROTATE bar indicates the last point at which the aircraft can be safely rotated under present FAA regulations. The position of the GO bug indicates the last point at which the application of maximum thrust will result in the aircraft reaching rotation speed (at the ROTATE bar position) and achieve a safe takeoff. The position of the STOP bug indicates the last point at which the application of maximum braking will result in the aircraft stopping before reaching the end of the runway. As long as the bugs remain in front of the airplane symbol, the denoted option (go or stop) remains available. Once the airplane symbol passes a bug, the denoted option is no longer available. Preferably, the microprocessor controlled symbols also include: an engine-out (EO) bug that indicates the last point at which the application of maximum thrust will allow the aircraft to safely takeoff with an inoperative engine; and, a VMC bar indicating the distance needed to stop at the time the aircraft achieves minimum control speed.

U.S. Pat. No. 5,353,022 to Middleton et al. issued on Oct. 4, 1994 with the title "Airplane takeoff and landing performance monitoring system", and is incorporated herein by reference. This patent describes he invention is a real-time takeoff and landing performance monitoring system for an aircraft which provides a pilot with graphic and metric information to assist in decisions related to achieving rotation speed (VR) within the safe zone of a runway, or stopping the aircraft on the runway after landing or take-off abort. The system processes information in two segments: a pre-takeoff segment and a real-time segment. One-time inputs of ambient conditions and airplane configuration information are used in the pre-takeoff segment to generate scheduled performance data. The real-time segment uses the scheduled performance data, runway length data and transducer measured parameters to monitor the performance of the airplane throughout the takeoff roll. Airplane acceleration and engine performance anomalies are detected and annunciated. A novel and important feature of this segment is that it updates the estimated runway rolling friction coefficient. Airplane performance predictions also reflect changes in head wind occurring as the takeoff roll progresses. The system provides a head-down display and a head-up display. The head-up display is projected onto a partially reflective transparent surface through which the pilot views the runway. By comparing the present performance of the airplane with a continually predicted nominal performance based upon given conditions, performance deficiencies are detected by the system and conveyed to pilot in form of both elemental information and integrated information.

U.S. Pat. No. 5,499,025 to Middleton et al, issued on Mar. 12, 1996 as a continuation of U.S. Pat. No. 5,353,022, and is incorporated herein by reference.

PCT/GB2002/002199 application by Eshelby et al. published as WO2002097764 A2, on Dec. 5, 2002. This application also published as U.S. Pat. No. 7,158,052 to Zammit-Mangion, et al., which issued on Jan. 2, 2007 with the title "Method and system for monitoring the performance of an aircraft during take-off", and is incorporated herein by reference. This patent describes a system, method and display for monitoring the performance of an aircraft during the take-off maneuver that includes the steps of monitoring the progress of the take-off maneuver by acquiring data representative of the aircraft's motion at a plurality of points during the maneuver, generating a function that best fits the acquired data, and using the generated function to predict future progress of the maneuver.

There remains a need in the art for a total runway safety system.

SUMMARY OF THE INVENTION

In some embodiments, the present invention provides a total runway safety system (TRSS) which measures, monitors, manages, and informs flight crew on the progress of takeoffs and landings and of any hazardous runway conditions. In some embodiments, the TRSS measures, monitors, manages, controls and informs flight crew of actual longitudinal and lateral runway tracks thus preventing overruns and veer-offs during takeoffs and landings (with and without engine failure). In some embodiments, the TRSS continuously calculates, monitors and informs the flight crew about the point-of-no-return (PNR) or commit-to-land (NTSB definition) runway point after which no aborted/rejected landing and consequent go-around should be attempted. In some embodiments, the TRSS uses backscatter of infrared laser beams to evaluate groundspeed and the reflectivity of the runway surface thus also making estimates of the surface conditions, roughness and contamination which will affect rolling and braking efforts down-the runway and ultimately future lateral and longitudinal acceleration levels. In some embodiments, the TRSS uses accelerometers to measure in real-time current runway lateral and longitudinal acceleration with integrators to deliver current speeds and distance increments. In some embodiments, the TRSS uses real-time digital image processing of fast optical and infrared (thermal imaging) images to evaluate the depth, percentage, type, and the amount of runway surface covered with contamination. In some embodiments, the TRSS uses surface and subsurface (volume) backscattering theoretical models to evaluate the depth and the kind of the surface contamination. In some embodiments, the TRSS integrates information received from a variety of on-board electronic navigation and guidance systems such GPS (Global Positioning System), SBAS (Satellite-Based Augmentation System), GBAS (Ground-Based Augmentation System), ILS/MLS/DME (instrument landing system/microwave landing system/distance measuring equipment), onboard IRS (ring laser gyro strapped-down Inertial Reference Systems), and ATC (Air Traffic Control) and/or airport-reported runway braking conditions with the infrared laser (side, forward- and down-looking), ultrasound ranging and imaging, and optical/infrared camera digital images to find the best estimates of the current and future lateral and longitudinal runway remaining, speed, acceleration, and jerk (surge). In some embodiments runway-based (SafeRunway) and spatially located acoustic and electromagnetic cameras and sensors transmit the information to TRSS systems and ATC. In some embodiments gyro-stabilized mm-size microwave radiometers (typically in one or more ranges between 1 and 300 GHz) of passive and active types conduct continuous measurements, which are used to measure, estimate, determine and/or monitor surface emissivity/reflectivity, temperature and runway surface properties (type of ice (wet, compacted/packed, dry, etc.), concentration, snow, moisture content, etc.). In some embodiments, brightness temperature measured by microwave radiometers is used to estimate the water content of the ice/snow and provides information on the expected tire-surface coefficient of friction (COF). In some embodiments, the TRSS measures and estimates the current and expected lateral (sideways) and longitudinal (down-the-runway) COF and acceleration/deceleration levels and feeds them into predictive real-time software, which informs pilots and makes its estimate of the best decisions and choices in terms of safety to protect airplane and occupants.

In some embodiments, the TRSS implements a worldwide gravitational model in performance calculations using International Gravitational Formula (IGF). In some embodiments, the TRSS also processes gravitational anomalies obtained from current and updated gravitational satellite measurements. In some embodiments, the TRSS includes change of weight/mass effects during takeoffs and landings for more accurate accelerations and performance predictions. In some embodiments, the TRSS incorporates a reactive rocket-propulsive thrust component due to fuel consumption in all jet engine thrust computations. In some embodiments, the TRSS includes the momentum-drag losses of the net thrust. In some embodiments, the TRSS includes planned/scheduled regulatory runway alignments and rolling-takeoff distances for calculations and incorporates actual real-time values for actual takeoff operations thus diminishing airport-authority-declared available runway distances. In some embodiments, the TRSS incorporates any runway geometry with available stopways (STPWYS) and clearways (CLRWYS) and the existence of runway-based arrestor systems (such as EMAS). In pre-takeoff planning phase Balanced (BFL) and unbalanced takeoff (UBFL) computations and estimates are performed and appropriate V1 (takeoff decision/action) speed chosen. In some embodiments, the TRSS makes available to flight crew a range of safe takeoff airspeeds between VGO (minimum speed to continue takeoff after engine failure) and VSTOP (maximum speed to abort/reject takeoff after engine failure) if the takeoff weight/mass is less than maximum allowed or EMAS exists for emergency operation. Here, V1 speed is the maximum STOP speed and minimum GO speed when OEI (One Engine Inoperative) for BFL. In some embodiments, the TRSS monitors and manages all engine-related takeoff scenarios: AEO (All Engines Operating) and OEI. In some embodiments, the TRSS makes estimates of rolling and braking coefficients of friction down the runway based on fast processing of optical, microwave, and infrared digital images (side, down, and forward). In some embodiments, the TRSS uses current/existing Available Braking Energy (ABE) based on the design maximum braking energy capacity, brake temperatures, and the existing current taxiing and residual braking energy capacities (see FIG. 14 and Appendix A). In some embodiments, the TRSS receives the information from the brakes computers about the current state of wear and representative temperatures of brakes. In some embodiments, the TRSS receives status and integrity condition form a plethora of critical subsystems, such as, the anti-skid system, thrust-reversing system, lift-dump system, hydraulic system, engine's FADECs (full-authority digital engine (or electronics) control), tire condition, temperature, and pressure, etc. In some embodiments, the TRSS uses infrared laser to gain information about remaining runway length, current groundspeed, and actual current acceleration and jerk (change of acceleration). In some embodiments, the TRSS uses digital visual and active/passive infrared cameras (e.g., night operation) for evaluation of runway surface and thus estimates of future accelerations. In some embodiments, the TRSS uses ultrasound beams to accomplish the same task as visual and infrared digital cameras and is especially suitable for poor weather conditions (e.g., fog, mist, night). In some embodiments, the TRSS uses microwave beams to accomplish the same task as ultrasound beams, visual and infrared digital cameras and is especially suitable for poor weather conditions and low optical visibility.

In some embodiments, the TRSS includes dedicated runway computers and aircraft computers that process runway potential energy storage and the kinetic energy storage of an aircraft (see FIG. 22). In some embodiments, the TRSS includes at least two, for redundancy, dedicated central TRSS computers 2110 (see FIG. 21) that use sophisticated mathematical estimators (such as shown in the attached appendices) of future predicted acceleration levels to assist flight crew in real-time critical operational decision making. In some embodiments, the TRSS computer relays information to visual and voice generators that are presented in the cockpit to flight crew. In some embodiments, the TRSS is one of, typically, four-to-six individual and independent TRSS multi-sensor units located in transport-category airplane certified under U.S. Title 14 CFR 25 or EASA CS 25 (the European Aviation Safety Agency Certification Specification for large aircraft). Each compact multi-sensor units may consist of several independent optical, infrared, microwave and ultrasonic transmitters. In some embodiments, one TRSS multi-sensor unit is placed in each gear assembly (two in the main underwing gear assemblies and one in nose gear assembly, the fourth TRSS is located in the nose (usually close to the aircraft's radome) and is protected by a door in normal flight. In some embodiments, the fifth and the sixth TRSS multi-sensor units are located in retractable/extendable booms (poles) on the upper fuselage and the vertical tail tops that deploy/retract synchronously with the landing gears. In some embodiments, as the landing gear is deployed for landing or is retracted after takeoff, each TRSS unit works independently and provides redundancy while reducing measurement uncertainties. In some embodiments, after gear retraction, the TRSS is disabled and no longer needed until next approach and landing. In some embodiments, the TRSS units are therefore mechanically protected during most of the flight time and not exposed to high dynamic air pressures and risk damage due to debris.

In some embodiments, the TRSS of landing and/or taking-off aircraft relays the temporal and spatially-resolved runway conditions, rolling and braking actions and other relevant information to ATC and/or directly to other aircraft via communication links.

BRIEF DESCRIPTION OF THE DRAWINGS

The following figures are relevant to some embodiments of the present invention.

FIG. 1C is a flow chart of a second portion 103 of an overall method 102-103 that uses total runway safety computer system 160, according to some embodiments of the present invention.

Figure 1A:
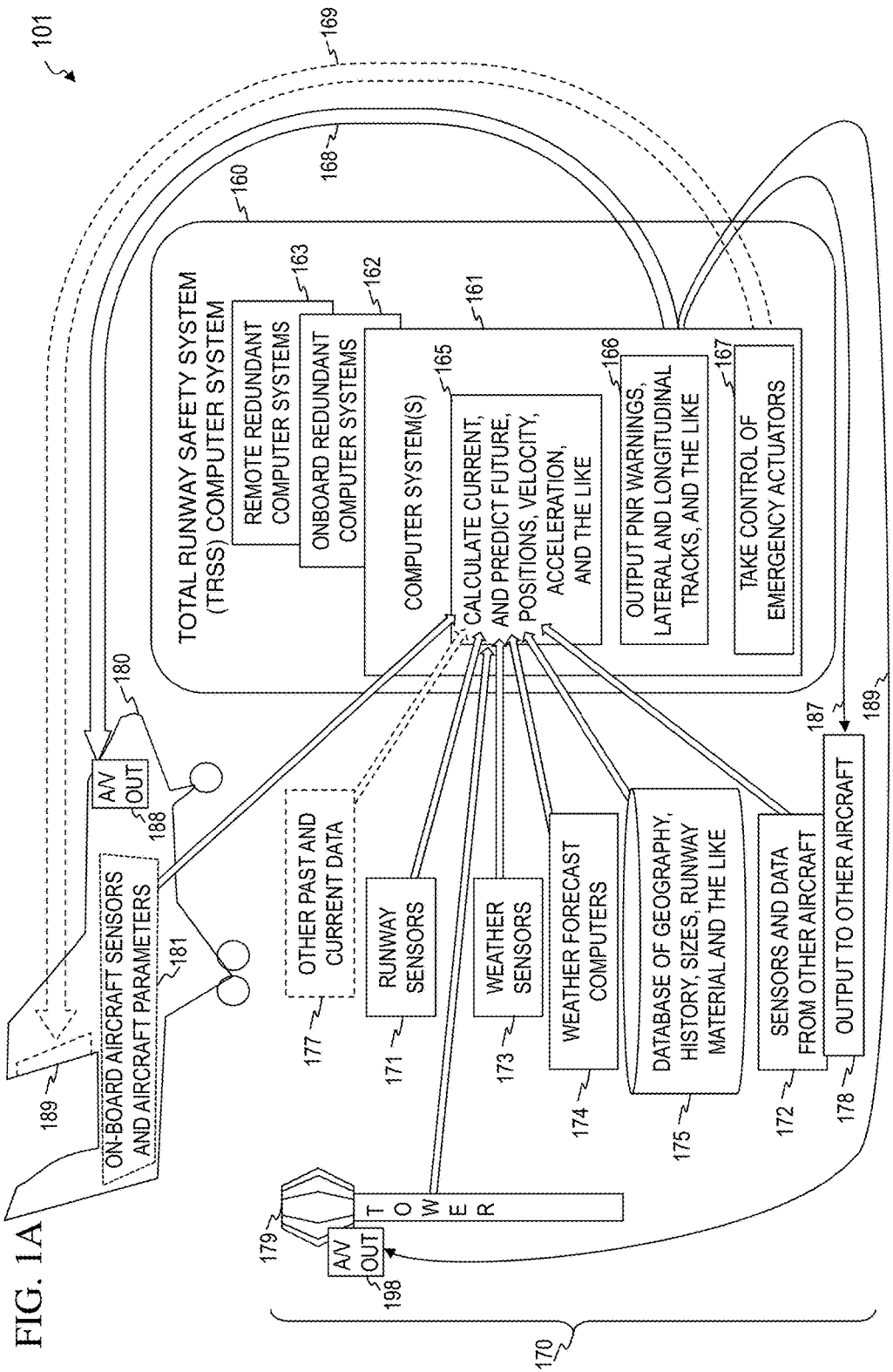
FIG. 1A is a block diagram of an overall total runway safety system (TRSS) 101 that includes a total runway safety system 160, according to some embodiments of the present invention.

In addition, the attached Appendices A, B, C, D, and E and their respective Figures form a part of this specification.

DESCRIPTION OF PREFERRED EMBODIMENTS

Although the following detailed description contains many specifics for the purpose of illustration, a person of ordinary skill in the art will appreciate that many variations and alterations to the following details are within the scope of the invention. Specific examples are used to illustrate particular embodiments; however, the invention described in the claims is not intended to be limited to only these examples, but rather includes the full scope of the attached claims. Accordingly, the following preferred embodiments of the invention are set forth without any loss of generality to, and without imposing limitations upon the claimed invention. Further, in the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. The embodiments shown in the Figures and described here may include features that are not included in all specific embodiments. A particular embodiment may include only a subset of all of the features described, or a particular embodiment may include all of the features described.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

For abbreviations not specifically set forth or defined in this specification and the attached appendices, the standard definitions, well known in the art, apply.

In some embodiments, the invention provides a real-time total airplane-runway energy monitoring and management systems (sometimes referred to herein as a Total Runway Safety System (TRSS) 101) that provides safety during all runway operations, and specifically including takeoffs and landings. In some embodiments, the system is designed to prevent runway excursions and, incidents and accidents, during all runway operations and specifically to prevent runway overruns and veer-offs during rejected-takeoffs (RTO's), landings under all normal, abnormal and emergency conditions, executing safe go-around before and after touchdown (runway point-of-no-return or commit-to-land point). In some embodiments, the TRSS includes a takeoff and landing calculator that takes into consideration sensor parameters that indicate current aircraft mass and weight (gravitational data in the computer depends on appropriate latitude and longitude), aircraft current location, speed, acceleration, and jerk (surge), runway condition (dry, damp, wet, various contamination levels), wind profiles (headwind, tailwind, crosswind components), air temperature, pressure, and density (Air-Data-Computers), IAS/CAS/EAS and TAS airspeeds, groundspeed (GS), expected thrust, aerodynamic drag and rolling friction drag, braking friction drag (retarding force), as well as local and average lateral and longitudinal runway slope (spatial information). In some embodiments, the TRSS thus fully protects the operational envelope during taxiing, takeoff and landing operations.

While modern semi-autonomous and advanced automotive vehicles (cars) use cameras and radars to evaluate distances and hence speeds, none of the solutions is capable of estimating the surface/road conditions lying ahead at all reliably and determining what would be expected in terms of lateral and longitudinal accelerations, speeds, and distances covered. For example, cars on a highway have no reliable means to evaluate road COF to estimate what would be braking distance if suddenly slippery conditions are encountered (ice, hydroplaning conditions, etc.). As an example, the U.S. Pat. No. 5,353,022 by Middleton (1994) can only measure current existing acceleration and performance in real-time. However, such solution does not provide any prediction, forecast, likelihood, or estimates of future performance which is essential for true real-time safe runway operations. Since airplanes are operating at very high speeds during takeoffs and landings (about 140-180 mph), the surface condition is critical to safe operation. Only by knowing to sufficiently high accuracy what future performance will be, can the aircraft runway operations be made much safer. An aircraft has only a limited distance in which or to dissipate the total energy or use the runway energy capacity to convert it into the minimum safe total energy for takeoff. It is a known fact that runway overruns and veer-offs constitute a majority of accidents in commercial air transportation world-wide, but also is a big negative factor in general aviation operations.

FIG. 1A is a block diagram of an overall total runway safety system (TRSS) 101 that includes a TRSS computer system 160, according to some embodiments of the present invention. In some embodiments, TRSS 101 includes a plurality of input devices and sensors 170 and 181 that provide input data to TRSS computer system 160 and a plurality of visual and/or audio output devices 178, 188 and 198 that present information, based on data outputs 187, 168, and 189 (e.g., transmitted wirelessly or by wires, fiber optic cables or other suitable means), to the flight crew of aircraft 180, the flight crews of other aircraft 172 and/or the crew of airport tower 179, respectively. In some embodiments, a plurality of TRSS computers 160 receive a number of input data in the pre-takeoff planning phase such as the local geographical data, airport and runway data 175, atmospheric, environmental and weather data 173 and weather forecast computer system 174, local runway sensor data 171

(when installed), Air Traffic Control (ATC) clearances and instructions, other current and past historical (including operational) data 177, other aircraft data 172. In some embodiments, TRSS computer system 160 includes a first TRSS computer system 161 (in some embodiments, some or all TRSS computer system 161 is located onboard aircraft 180, while in other embodiments, TRSS computer system 161 is distributed with some or all located off aircraft 180), and optionally one or more redundant computers (e.g., 162 onboard aircraft 180 and 163 located remote from aircraft 180). Takeoff and landing (control and performance) airspeeds, flap setting, and other configuration settings are calculated based on the current weight/mass and existing aircraft performance figures from onboard sensors 181. During actual takeoffs and approaches and landings, TRSS 101 measures (e.g., aircraft landing and takeoff execution, parameters and conditions regarding spatial distribution of runway surface conditions, depicted as computer functionality 166), monitors (e.g., compares over time the measured landing and takeoff parameters and conditions to predetermined values and combinations of values and spatial and temporal histories of the parameters), manages (e.g., automatically calculates and outputs data for each of a plurality of aircraft relative to takeoff and landing operations (predictions and inadequate braking due to overheated brakes) in coordination with ATC clearances, permissions and instructions, controls (e.g., automatically adjusts aircraft control inputs, thrust reverse, lift-dump (spoilers), flight control surfaces inputs, e.g., rudder, etc., depicted as computer functionality 167) and informs flight crew and ATC control tower (e.g., automatically notifies humans in the respective current and following aircraft (via output device(s) 178) on the progress of takeoffs and landings and of any hazardous runway conditions, company dispatch office, control tower, and ATC in general).

Figure 1B:
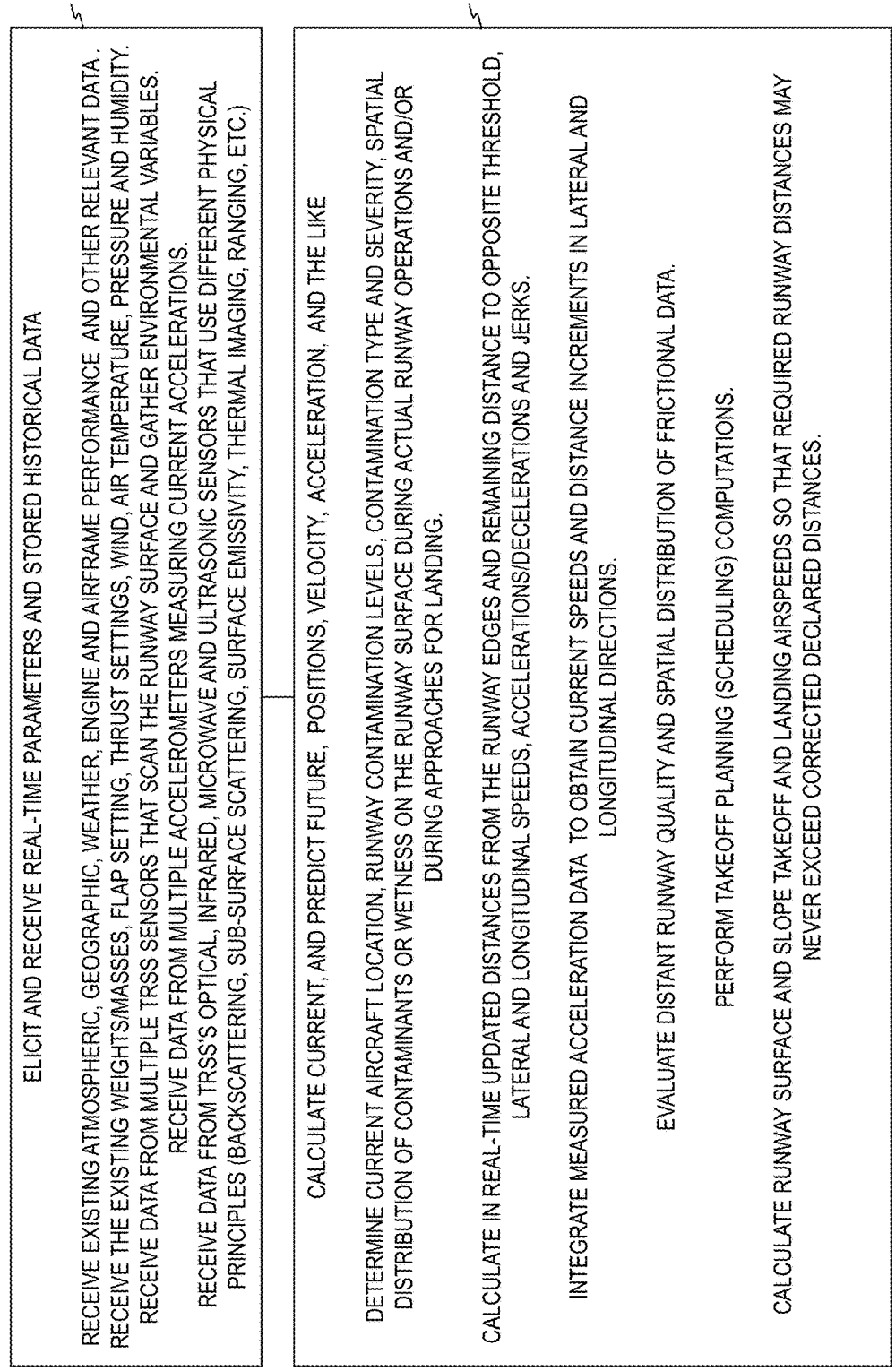
FIG. 1B is a flow chart of a first portion 102 of an overall method 102-103 that uses total runway safety computer system 160, according to some embodiments of the present invention.

FIG. 1B is a flow chart of a first portion 102 of an overall method 102-103 that uses total runway safety system 101 and total runway safety computer system 160, according to some embodiments of the present invention.

FIG. 1C is a flow chart of a second portion 103 of overall method 102-103 that uses TRSS 101 and total runway safety computer system 160, according to some embodiments of the present invention. Referring to overall method 102-103 of FIG. 1B and FIG. 1C together, the TRSS 101 elicits and receives a number of currently measured parameters as depicted in 164. The TRSS 101 uses current performance, and measures and predicts future performance, based on the multitude of active and passive electromagnetic and acoustic sensors, such as optical, infrared, microwave, and ultrasonic 165. Such methodology provides a capability to estimate future runway dynamics with high probability/likelihood and thus reconstruct or forecast future events. Such capability clearly would enable choice of best and timely corrective actions with the goal to keep aircraft and occupants safe during all takeoff and landing operations including abnormal and emergency scenarios. A number of normal, abnormal, and emergency takeoff and landing scenarios (zero-flap landing, rejected takeoffs and landings (PNR), operations on slippery runways with significant crosswind, overspeed takeoffs, etc.) can be thus predicted and output 166. Clearly, if there is a likelihood of adverse events occurring, a proper action can be taken before it occurs thus eliminating it or minimizing its negative impact. In extreme cases, when human pilots are not capable of reacting timely, TRSS 101 can assume full-authority and take the control 167 of the aircraft 180 with the goal to eliminate of minimize possible negative consequences.

In some embodiments, TRSS 101 presents takeoff and landing calculators and monitors tasked to first calculate and make available to the flight crew all planned/scheduled operationally critical control and performance airspeeds during takeoffs (VMCG, VEF, V1, VMCA, VR, VMU, VLOF, V2, V3, VMBE, VTIRE, etc.) and landings (VMCL1/2, VAPP, VREF, landing climb airspeed, approach climb airspeed, etc.) for existing average atmospheric conditions and aircraft weight and CG location. These airspeeds can be then modified as necessary by TRSS 101 in actual condition while taking into account the existing localized conditions (atmospheric, environmental, weather, actual runway condition and local slopes, etc.).

In some embodiments, the present invention predicts future (5, 10, 15, 20, 25, etc., seconds) values of down-the-runway COFs, acceleration levels, and hence lateral and longitudinal forces based on the current optical, infrared, microwave and/or ultrasound measurements and comparing them with the regular airport reports (e.g., ATIS/AWOS/ASOS) and reports from preceding aircraft landings. In some embodiments, a specially designed TRSS software (e.g., based on the formulas in Appendices A, B, C, D, and E) compares various current and predicted values of acceleration and based on that makes real-time recommendations to pilots regarding critical runway operations and decisions. In some embodiments, current and forecast accelerations on the runway come from many sensors which include existing aircraft air- and ground-speeds, wind, thrust and drag levels, current weight/mass, tire condition, brake conditions, fully modulated anti-skid (anti-lock and touchdown protection), and auto-brake systems (ABS), thrust reversers conditions, lift-dump (spoilers) condition, etc.

In some embodiments, TRSS 101 has inputs that include infrared sensors (e.g., passive and active), ultrasound sensors (e.g., in some embodiments, ultrasound sensors that operate typically between 50-200 kilohertz), atmospheric-condition sensors (e.g., barometric-pressure sensors, wind-speed and direction sensors, and the like), optical cameras, and air-traffic control feedback (e.g., feedback obtained via an Aircraft Communication Addressing and Reporting System (ACARS).

In some embodiments, TRSS 101 produces outputs that include predicted coefficients of friction, real-time calculations of recommended courses of action, aircraft-control signals, and transmissions of monitored runway conditions to nearby aircraft.

In some embodiments, current and forecast information is processed real-time in a dedicated TRSS central-processing-units and data sent to Voice and Visual information generation systems that continuously inform pilots on the current and predicted conditions visually and acoustically. Such information can be presented visually on existing glass-cockpit multi-function displays (MFDs), integrated into existing primary flight displays (PFDs) or separate dedicated and designed displays can be incorporated.

In some embodiments, TRSS 101 produces cockpit audio announcement for crew action and coordination, such as, BRAKES-BRAKES, GO-GO, STOP-STOP, REVERSE-REVERSE, SPOILERS-SPOILERS, GO-AROUND—GO-AROUND, REJECT-REJECT, RUDDER-LEFT, RUDDER-RIGHT, BRACE-BRACE, POWER-POWER, etc.

For further details of various aspects of the present invention, see attached appendices A, B, C, D, and E, which are incorporated herein by reference, for functionality implemented in sensors and computers of TRSS 101.

In some embodiments, the present invention provides a new comprehensive airplane safety system designed to assist flight crew (and, if required or so designed, to take over full authority/control) in all runway operations thus preventing takeoff and landing incidents and accidents:

a. A total runway safety system which measures, monitors, manages, controls and informs flight crew on the progress of takeoffs and landings and of any existing or upcoming hazardous runway conditions, the system comprising hardware and software that:

b. Some embodiments measure, monitor, manage, control and/or inform flight crew of longitudinal and lateral runway tracks thus preventing overruns and veer-offs during takeoffs and landings.

c. Some embodiments continuously measure the integrity and the operational status of various systems and subsystems such as brakes (with anti-skid and ABS), tires (pressure, temperature, wear and speed), thrust-reversers, lift-dump system (ground spoilers), nose and/or main/body-gear steering system, engine digital control (such as FADEC), AC and DC electric supply, etc.

d. In some embodiments, TRSS 101 incorporates takeoff and landing calculators and monitors that first calculate/predict runway performance in pre-takeoff planning phase based on reported conditions and later monitors and compares with the actual conditions and performance. In some embodiments, a historical database is constructed for future use in TRSS calculations and machine learning.

e. In some embodiments, TRSS 101 calculates the braking requirements for specific desired early runway exit (taxiway exit) or early STOP when conducting LAHSO (Land and Hold Short Operations) before and during landing maneuver and reports to the crew if such goal cannot be met while airborne before landing and during the landing (roll) process.

f. In some embodiments, TRSS 101 continuously monitors, updates, and informs the flight crew about the point-of-no-return (PNR) or commit-to-land (according to the National Transportation Safety Board (NTSB) definition) runway point after which no aborted/rejected landing and go-around should be attempted.

g. In some embodiments, TRSS 101 implements world-wide gravitational model in performance calculations using International Gravitational Formula. Some embodiments also incorporate, into these calculations, gravitational anomalies obtained from satellite measurements.

h. In some embodiments, TRSS 101 includes changes of weight and jet (turbofan) engine thrust effects during takeoffs and landings for more accurate accelerations and performance predictions.

i. In some embodiments, TRSS 101 incorporates rocket-propulsive (reactive) thrust component due to fuel consumption in all jet engine thrust computations.

j. In some embodiments, TRSS 101 includes planned/scheduled regulatory runway alignments and rolling-takeoff distance corrections for calculations and incorporates real-time measured and estimated values for actual takeoff operations thus diminishing available distances.

k. In some embodiments, TRSS 101 incorporates any runway geometry with available stopways and clearway and the existence of runway-based emergency arrestor systems (such as EMAS). Balanced field-length (BFL) and unbalanced (UBFL) takeoff computations and estimates are performed and appropriate V1 speed chose.

l. In some embodiments, TRSS 101 monitors and evaluates rejected takeoffs (RTO) and aborted landings (PNR) acceleration/deceleration transition zones.

m. In some embodiments, TRSS 101 makes available to flight crew a range of airspeeds between VGO and VSTOP if the takeoff weight/mass is less than maximum structural or performance limited. For BFL takeoffs V1 speed is the maximum stopping speed and the minimum go speed when OEI.

n. In some embodiments, TRSS 101 makes estimates of rolling and braking coefficients of friction (COF) based on processing of fast digital images (side, down, and forward). Surface contaminants are evaluated by processing of optical and infrared images and microwave signals resulting in spatial distribution of COFs.

o. In some embodiments, TRSS 101 uses backscatter of infrared laser beams and mm-size passive/active microwave transmitters to evaluate groundspeed and the reflectivity of the runway surface thus also making estimates of the surface conditions, roughness and contamination which affects rolling and braking efforts and ultimately acceleration.

p. In some embodiments, TRSS 101 uses infrared laser to gain information about remaining runway length, current groundspeed, and actual acceleration.

q. In some embodiments, TRSS 101 uses digital visual and active/passive infrared cameras (EVS) for evaluation of runway surface and thus estimates of future accelerations.

r. In some embodiments, TRSS 101 uses ultrasound beams to accomplish the same task as visual and infrared digital cameras and is especially suitable for poor weather conditions and for sideways motion detection.

s. In some embodiments, TRSS 101 integrates information received from a variety of electronic navigation and guidance systems such GPS (SBAS/GBAS), ILS/MLS/DME, onboard IRS, and ATC/airport reported runway braking conditions with the infrared laser (forward- and down-looking), ultrasound and digital images to find the best estimates of the lateral and longitudinal runway remaining, current speed, acceleration, and jerk (surge) (in both lateral and longitudinal directions).

t. In some embodiments, TRSS 101 has dedicated runway computers and aircraft computers that communicate with each other and continuously evaluate runway potential energy and the total (kinetic and potential) energy storages of an aircraft (see FIG. 22).

u. In some embodiments, TRSS 101 has dedicated TRSS computers 160 that use sophisticated estimators of future lateral and longitudinal acceleration levels to assist flight crew in real-time regarding critical operational decisions.

v. In some embodiments, TRSS computers 160 relay information as necessary to visual and voice generators that produce visual and/or audio outputs that are presented in the cockpit to flight crew.

w. In some embodiments, four to six TRSS units are located in a transport-category airplane certified under FAR 25 (Federal Aviation Regulations part 25). One in each gear assembly (two in main underwing gears and one in nose gear). The fourth is located in the nose (usually close to radome) and is protected by a door in normal flight. Fifth and Sixth unit located in the vertical tail and the upper forward fuselage section may deploy/retract with the landing gear. As the landing gear is deployed for landing or is extended during takeoff each TRSS system works independently and provides redundancy. After gear retraction, the TRSS may be disabled and no longer needed until landing. In this way, TRSS units are protected during most of the flight time and not exposed to high dynamic pressures and risk damage due to debris. However, the TRSS multi-sensor unit located in the aircraft nose cone may be still operational especially for the ultrasonic transducers to eliminate bird strike hazard at low altitudes.

- x. In some embodiments, TRSS 101 has dedicated brake computer that monitors brake wear and temperature and also tire wear and tire pressure. This brake computer also receives all the information from the anti-skid system (operational/non-operational, efficiency, etc.).
- y. In some embodiments, TRSS 101 measures the current side and down-the-runway expected acceleration and friction coefficients and feeds them into predictive software, which inform pilots and make the best choice in terms of safety to protect airplane and occupants.
- z. In some embodiments, TRSS 101 provides the ability for restricted lateral track changes and ground path optimization to avoid (navigate around) parts of the runways with heavier contamination (patches of contamination) with low COF and reduced lateral and longitudinal acceleration/deceleration levels if such maneuver is required.
- aa. In some embodiments, TRSS 101 calculates the actual hydroplaning speed (VP) based on reported and measured runway surface condition (surface reflectivity measurements with subsurface scattering optical and infrared lasers), tire wear and pressure in order to prevent loss of control during landings and takeoffs.
- bb. In some embodiments, TRSS 101 calculates all critically important minimum control speed (VMCG, VMCA, VMCL) and also includes the effect of crosswind on dry and slippery runways on the magnitude of actual minimum control speed on the ground (VMCG) to avoid veer-offs during landings and takeoffs. Current VMCG computations do not take into account crosswind effect.
- cc. In some embodiments, TRSS 101 handles all abnormal and emergency landing scenarios, such as, zero-flap landing, flight-control degradation and malfunctions, tire and wheel problems, inoperative equipment (such as anti-skid), etc., and disseminate such information and recommendations to the flight crew in a timely fashion.
- dd. In some embodiments, TRSS 101 implements machine-learning capability where previous similar runway surfaces, landing and takeoff scenarios are analyzed and hence a best course of action and best operating practices are developed for future comparable conditions.
- ee. In some embodiments, TRSS 101 calculates special takeoff scenarios such as overspeed or improved climb takeoffs for which an airplane is climb and/or obstacle limited but not field-length limits.

Figure 2A:
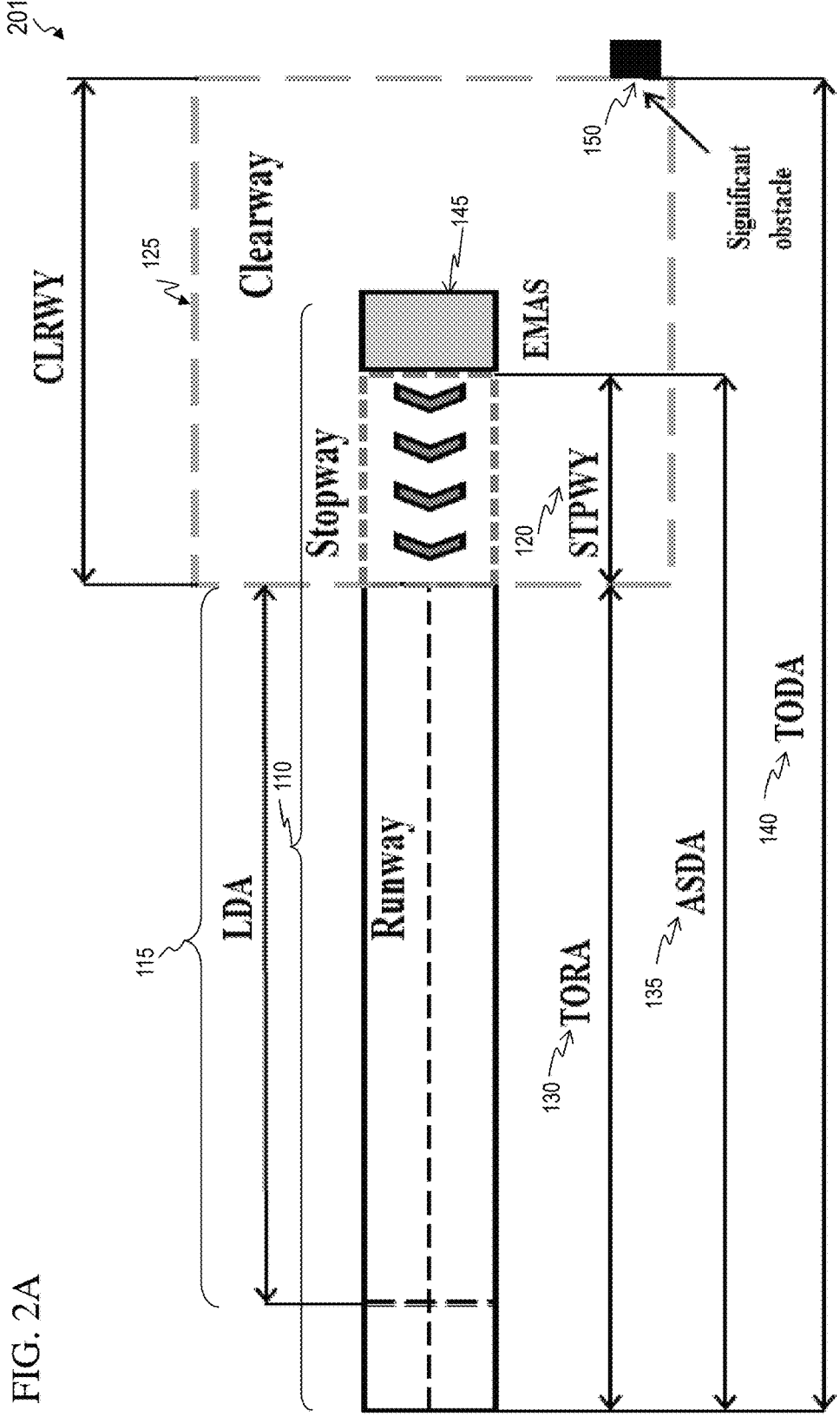
FIG. 2A illustrates generic instrument runway architecture 201, available performance distances, definitions of performance lengths with and without stopways and clearways and when available EMAS (Engineered Materials Arresting systems).

FIG. 2A illustrates a generic instrument runway architecture 201, available performance distances, definitions of performance lengths with and without stopways and clearways and when available EMAS (Engineered Materials Arresting systems). In some embodiments, runway architecture 201 indicates the following standard terms as well understood by persons of skill in the art: 110 is LDA plus EMAS that can be used by TRSS 101 in emergency, 115 is landing distance available (LDA), 120 is stopway (STPWY), 125 is clearway (CLRWY), 130 is takeoff run available (TORA); 135 is accelerate-stop distance available (ASDA), 140 takeoff distance available (TODA). Sometimes runways have EMAS which is designated as 145. The clearway (125) is defined up to the first significant non-frangible obstacle 150 and cannot exceed 50% (sometimes less) of TORA for takeoff calculations. TRSS 101 is first calculating the REQUIRED values for takeoff or landing, as opposed to the AVAILABLE parameters as shown in runway architecture 201. Available or declared distances are provided by airport authority. Regulatory corrections for runway alignment and rolling-takeoff are applied for every specific aircraft make and model. Required distances are those values that the aircraft will most likely need under given atmospheric conditions, weight/mass, and runway conditions (slope, contamination, etc.), thrust setting and brakes conditions (anti-skid on/off). Required distances (TODR, TORR, ASDR) are calculated for all scenarios AEO (All Engines Operating) and OEI (One Engine Inoperative) for dry, wet, and contaminated runways and may include also other events (such as tire failure). During actual takeoff or landing, TRSS 101 now measures actual distance, speed, acceleration, and jerk (surge) parameters, and estimates such future values based on a plurality of aircraft-based and occasionally runway-based sensors. Planned or actual (existing during operation) required distances may never exceed available. The status of operation is relayed to crew visually as GREEN (normal), YELLOW (caution), and RED (Alert/warning/emergency condition). TRSS 101 also calculates and informs the crew of corrective actions.

In some embodiments, the actual data gathered during runway operations include aircraft's CG (Center of Gravity), lateral and longitudinal runway locations and distances (covered and remaining), lateral and longitudinal speeds, lateral and longitudinal accelerations, lateral and longitudinal jerks (surges or changes of acceleration). Also, various sensors (e.g., 181 and/or 171 of FIG. 1A) are continually scanning runway surface sideways, ahead and down the runway to estimate the runway surface conditions (dry, dump, wet, contaminated) and thus predict future rolling and braking conditions and operational distances needed. Local lateral and longitudinal runway slopes (e.g., from 181, 175 and/or 179 of FIG. 1A) are also taken into consideration. Also, all other atmospheric conditions (wind, temperature, pressure, precipitation, ice, etc. (e.g., from 173 and/or 174 of FIG. 1A)) are continually measured and monitored. Engine and aircraft systems integrity and current capabilities (e.g., from 181 of FIG. 1A) are being monitored and used for predictive calculations. See Appendices A, B, C, D, and E.

Figure 2B:
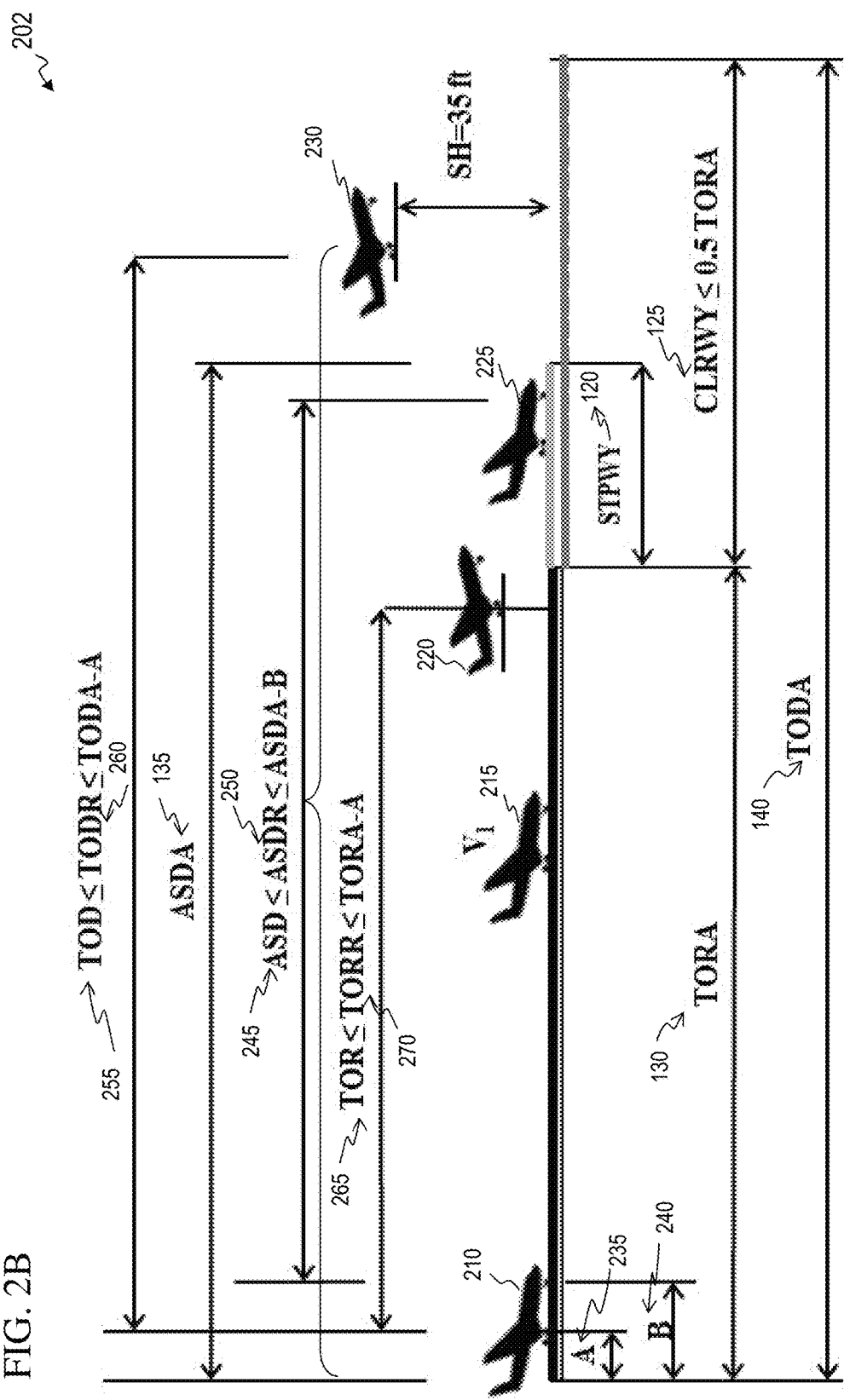
FIG. 2B illustrates various gross and regulatory gross (factored) and net (required or factored) takeoff distances 202 (ASD/ASDR, TOR/TORR, TOD/TODR).

FIG. 2B illustrates various gross and regulatory net (required) takeoff distances 202 (ASD/ASDR, TOR/TORR, TOD/TODR). Here the airplane 210 in starting (BRP—Brake Release Point) position is identified as 210 (runway alignment corrections A and B applied). Reaching the V1 speed is identified as 215 at which the airplane will or continue takeoff or abort takeoff due to an engine failure or other event. The airplane clears takeoff runway at the point 220 reaching certain airspeed and screen height. At the point 225 the airplane stopped on available ASDS (and EMAS in emergency) after rejecting takeoff at V1 (identifier 215). At the point 230 the airplane has safely completed takeoff reaching minimum 15 or 35 feet (wet/dry runway) and minimum airspeed V2 (Takeoff safety speed). Runway-alignment and rolling takeoff corrections (runway reductions) for the main and nose gear are identified in 235 and 240 respectively. The gross (unfactored) and net (factored or required) accelerate-stop distances (ASD(R)) are identified in 245 and 250 respectively. Gross (unfactored) and net (factored or required) takeoff distances (TOD(R)) are identified as 255 and 260 respectively. Gross (unfactored) and net (factored or required) takeoff runs (TOR(R)) are identified as 265 and 270 respectively.

Figure 3:
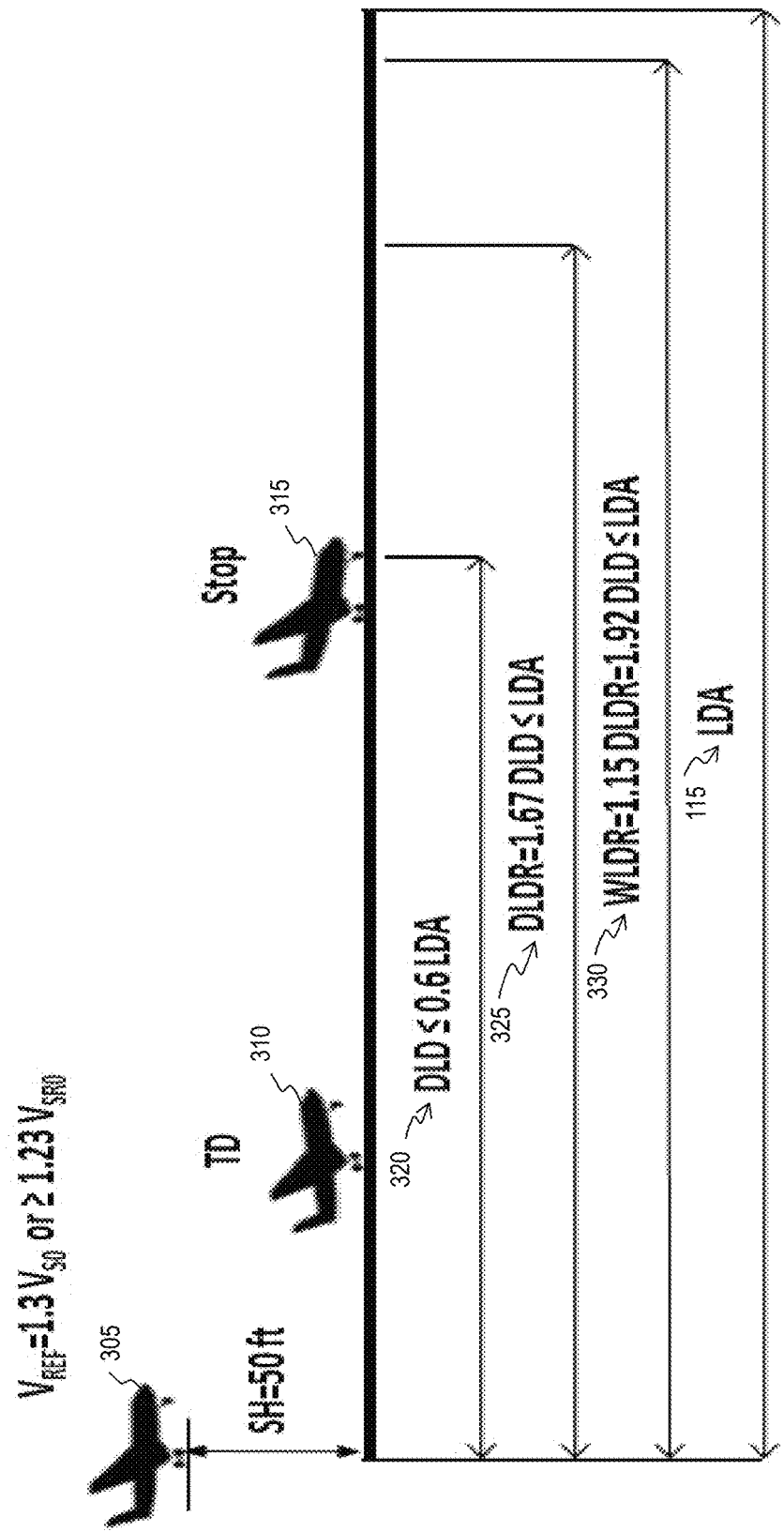
FIG. 3 illustrates various gross and regulatory net (required or factored) landing distances 301 (LD/LDR).

FIG. 3 illustrates various gross and regulatory net (required) landing distances 301 (LD/LDR). The airplane 305, when touching down on a landing runway at actual distance and speed after crossing the screen height at given airspeed and height is depicted with 310. After maximum braking action the airplane will stop as depicted in 315 defining demonstrated or gross landing distance (DLD) in dry condition for level hard runway surface identified as 320. Net or required landing distance for dry runway is DLDR identified as 325. In the case of wet runway, the net or required landing distance is increased by additional 15% and depicted with 330; 115 is landing distance available (LDA). The TRSS 101 will calculate required touchdown range and speed range for which a safe landing can be still made. Proper audio-visual information, status, cautions, and warnings will be timely displayed to a flight crew in a cockpit. If the runway was estimated to be too hazardous to attempt landing or the (factored or unfactored) landing success was in doubt (too short, airplane not in proper configuration, speed and height, contamination, excessive wind, wind-shear, etc.) the TRSS 101 will announce recommendations timely based on estimated decelerations.

Figure 4:
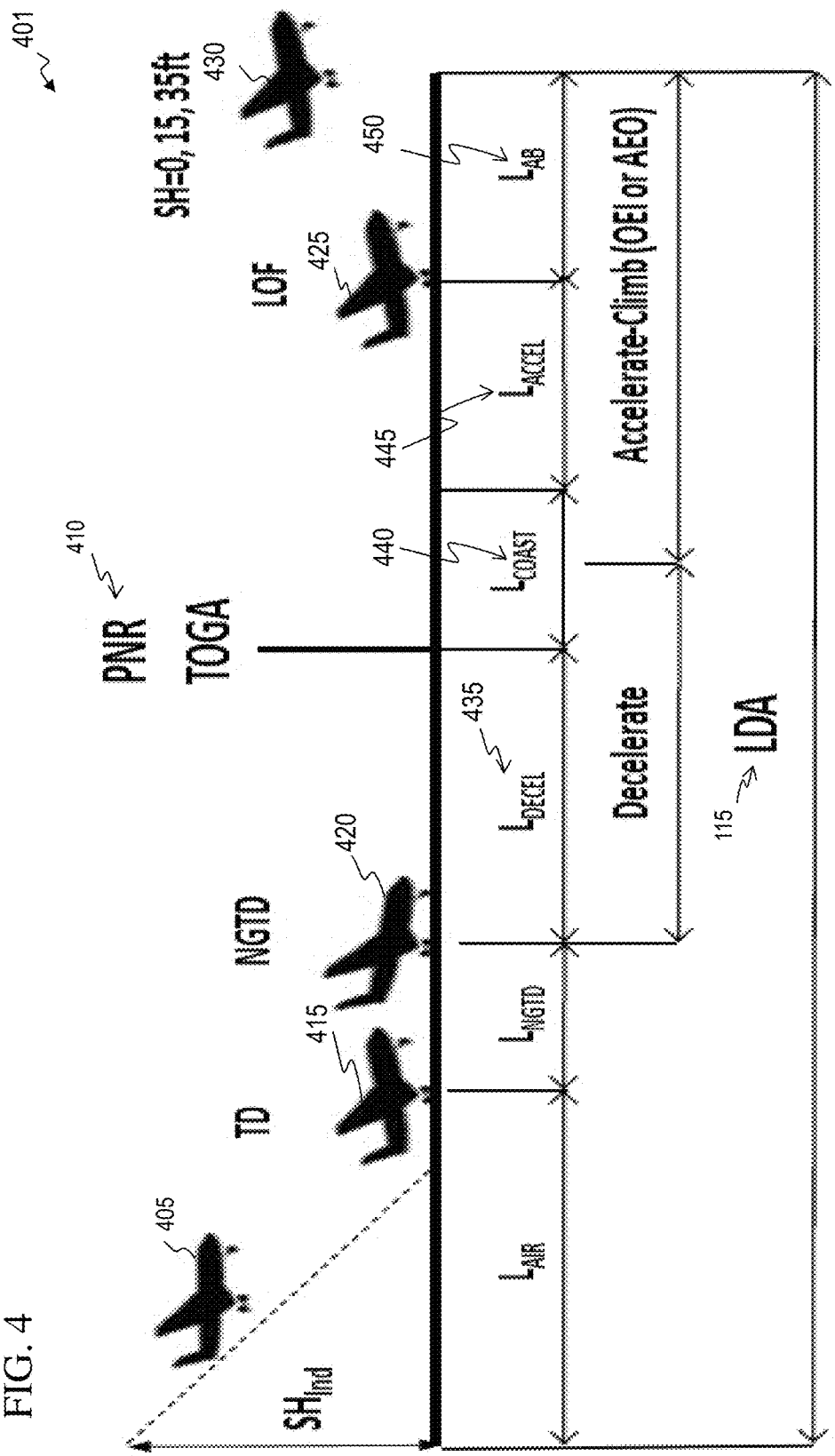
FIG. 4 illustrates runway distances definition of PNR (point-of-no-return) 401 for go-around after touchdown (aborted/rejected landing).

FIG. 4 illustrates runway distances including a definition of PNR (point-of-no-return) 401 for go-around after touchdown (aborted/rejected landing). A PNR point 410 on the runway depends on many factors as discussed in Appendix E journal article. The airplane 405, when touching down is depicted with reference number 415. The nose gear is lowered at reference number 420 and the braking ensues, slowing it down. The latest point from which landing deceleration can be aborted is PNR point 410, and is dynamically calculated by TRSS 101. Airplane rejecting landing and going around and about to lift-off is depicted in 425. Airplane successfully clears takeoff distance at the point 430 for given runway and atmospheric conditions reaching required speed (V2 minimum) and screen height (15 or 35 feet minimum). The deceleration distance is depicted as 435, the configuration change (inertia or decelerate-accelerate transition zone) is identified with 440, acceleration ground roll (AEO or OEI) with 445, and the airborne distance to cross required screen height at V2 airspeed as 450. In many respects rejected landing (decelerate-accelerate) is just an inverse situation form rejected takeoff (accelerate-decelerate).

Figure 5:
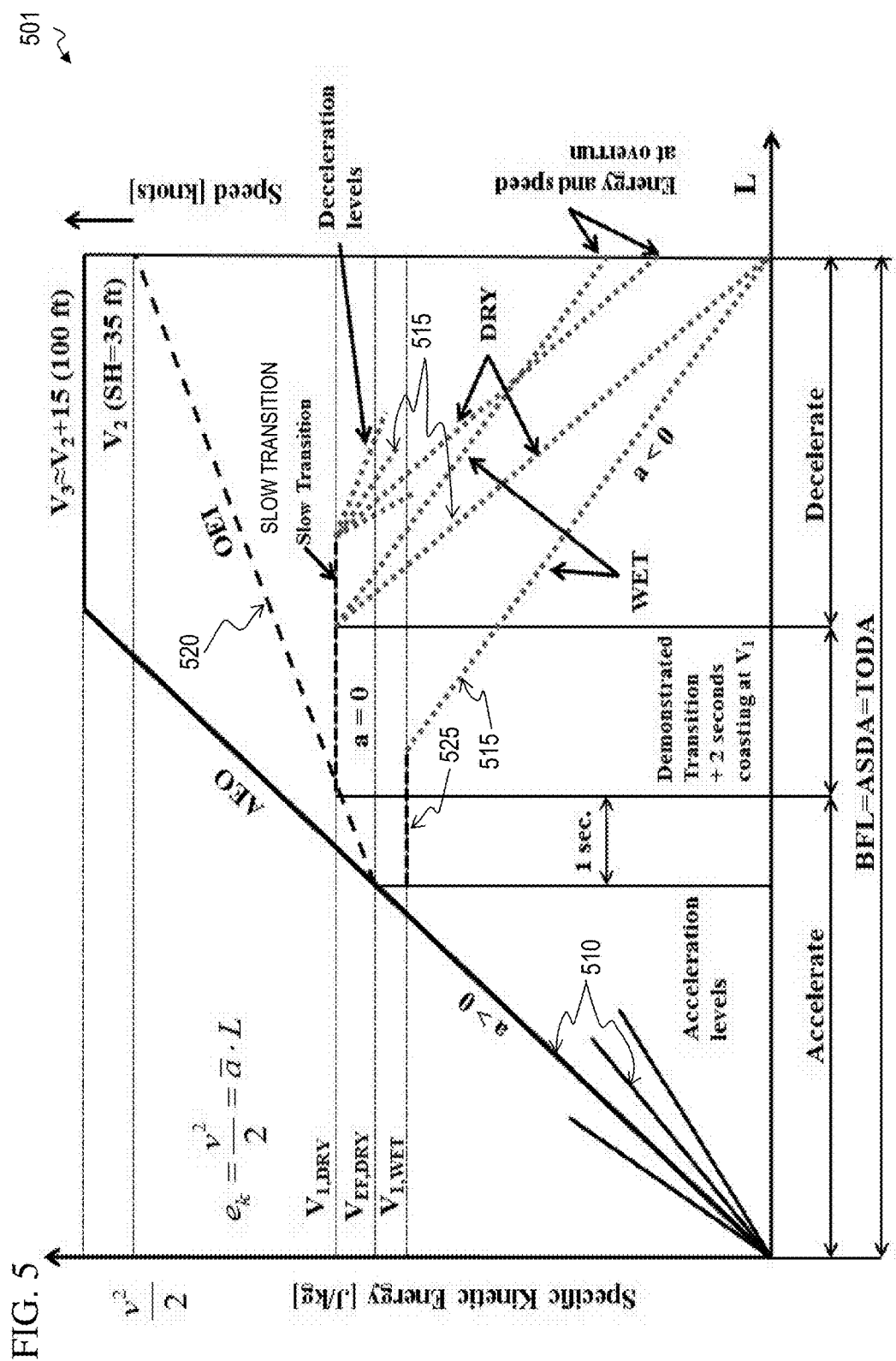
FIG. 5 illustrates changes in total energy 501 (mostly kinetic) and distances during takeoff maneuver for both AEO, continued OEI takeoff and AEO and OEI rejected (aborted) takeoff (RTO).

FIG. 5 illustrates changes in total energy (mostly kinetic) and distances during takeoff maneuver for both AEO, continued OEI takeoff and AEO and OEI rejected (aborted) takeoff (RTO) 501. Various acceleration (in figure shown as constant for simplicity) levels during takeoff (510) are measured and future estimated from TRSS 101 measurements and real-time processing. Also, various deceleration levels during rejected takeoff phase (OEI or AEO) are depicted with 515. The kinetic plus potential energy versus distance for continued OEI situation is designated with 520. With the constraint that the airplane achieves takeoff safety speed V2 before reaching (e.g., dry runway screen height) of 35 ft. (about ten meters). The acceleration-deceleration transition zone (525) in which an airplane goes from accelerating to stopping is monitored by TRSS 101 in real-time transition, while providing visual and audio cockpit signals to flight crew. Too slow transition even for appropriately estimated speeds may still cause overruns. The TRSS 101 in full-authority mode could override pilot action and apply maximum breaking efforts to prevent overrun.

Figure 6:
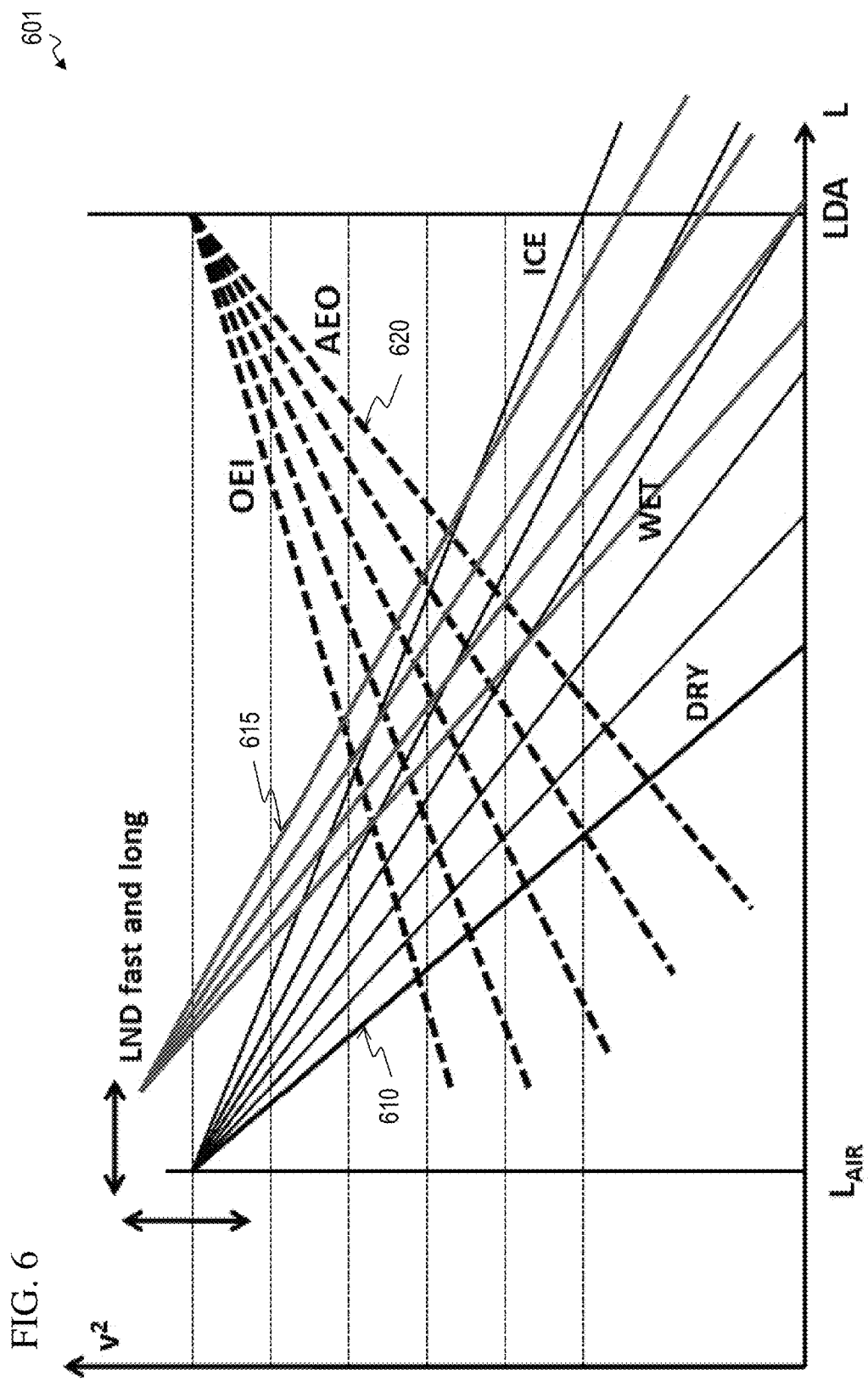
FIG. 6 illustrates changes in specific kinetic energy 601 (also applies to total energy with sloped runways) for rejected landing role maneuver (go-around after touchdown).

FIG. 6 illustrates changes in specific kinetic energy (also applies to total energy with sloped runways) for rejected landing role maneuver (go-around after touchdown) 601. Various constant deceleration levels (for dry, wet, contaminated runways) after landing at specific runway point and at specific kinetic specific energy is depicted with 610. Landing longer and/or at faster speed will cause larger consumption of landing runway even for the same deceleration levels as depicted with 615. As the airplane is commanded to abort landing and execute go-around (takeoff after landing roll) various acceleration levels will exist which will assume both AEO and OEI scenarios as depicted with 620. In any case after rejecting landing and for any condition an airplane will have to achieve 15 ft. (wet runway; about 5 meters) or 35 ft. (dry runway; about 10 meters) screen height at the end of TODA just after reaching V2 airspeed (see Appendix E).

Figure 7:
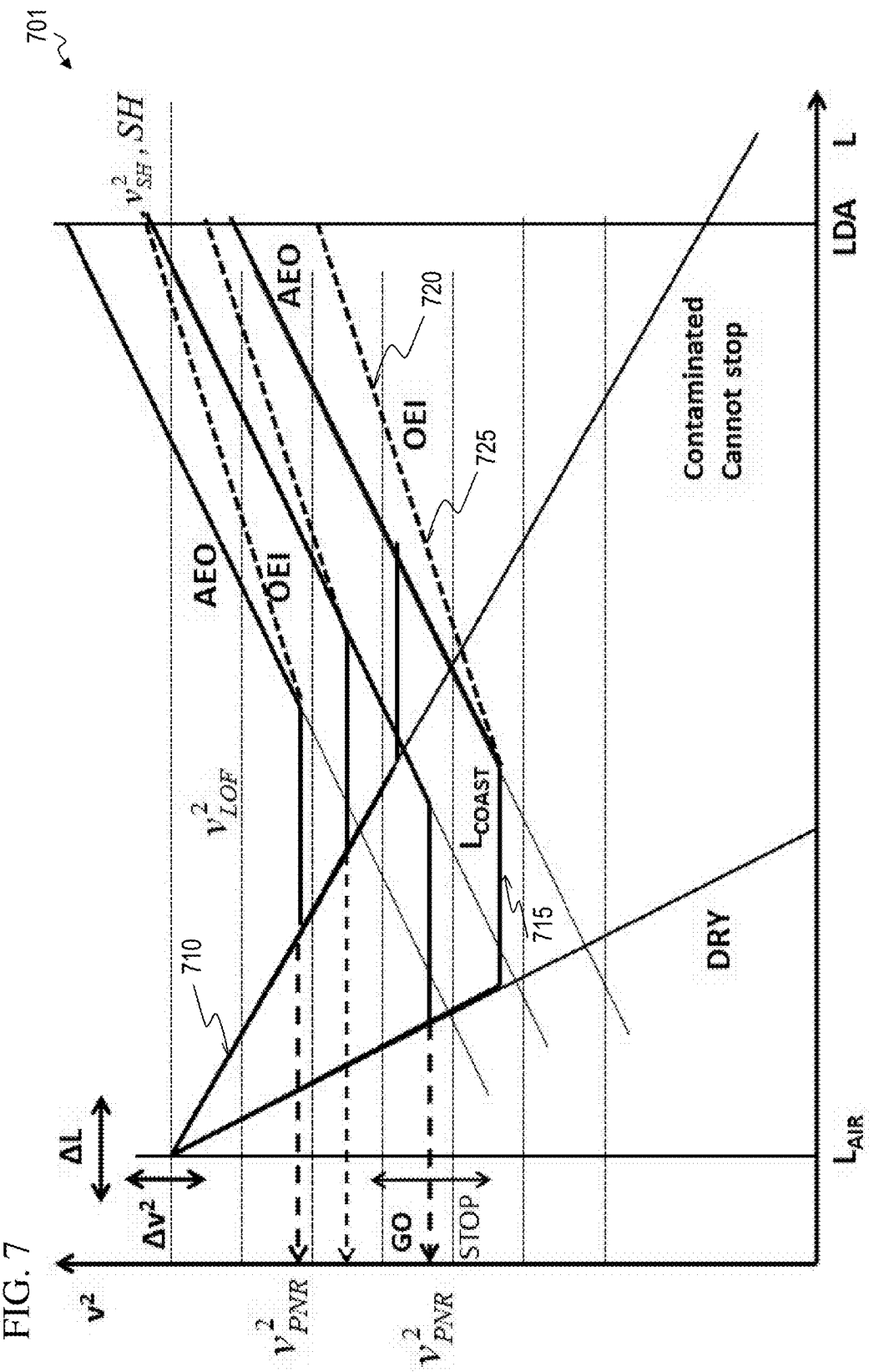
FIG. 7 illustrates definition of PNR point 701 or the lowest speed to which an airplane can slow down during landing roll, apply full takeoff thrust, lose an engine and still safely takeoff when OEI.

FIG. 7 illustrates definition of PNR point or the lowest speed to which an airplane can slow down during landing roll, apply full takeoff thrust, lose an engine and still safely takeoff when OEI, 701. Computations of exact PNR location is almost impossible for a human pilot to estimate as it depends on so many factors (exact touchdown point, energy at touchdown, time to lower the nose gear and start applying deceleration devices, etc.), of which the most important ones are knowing future acceleration and deceleration levels. The TRSS multi-sensor unit capabilities to estimate lateral and longitudinal future accelerations and decelerations calculate PNR quite accurately for arbitrary atmospheric and aircraft configuration conditions and inform pilots in real-time of best action (such as better to accept low-speed overrun than attempt impossible rejected takeoff (see Appendix D and E).

Figure 8:
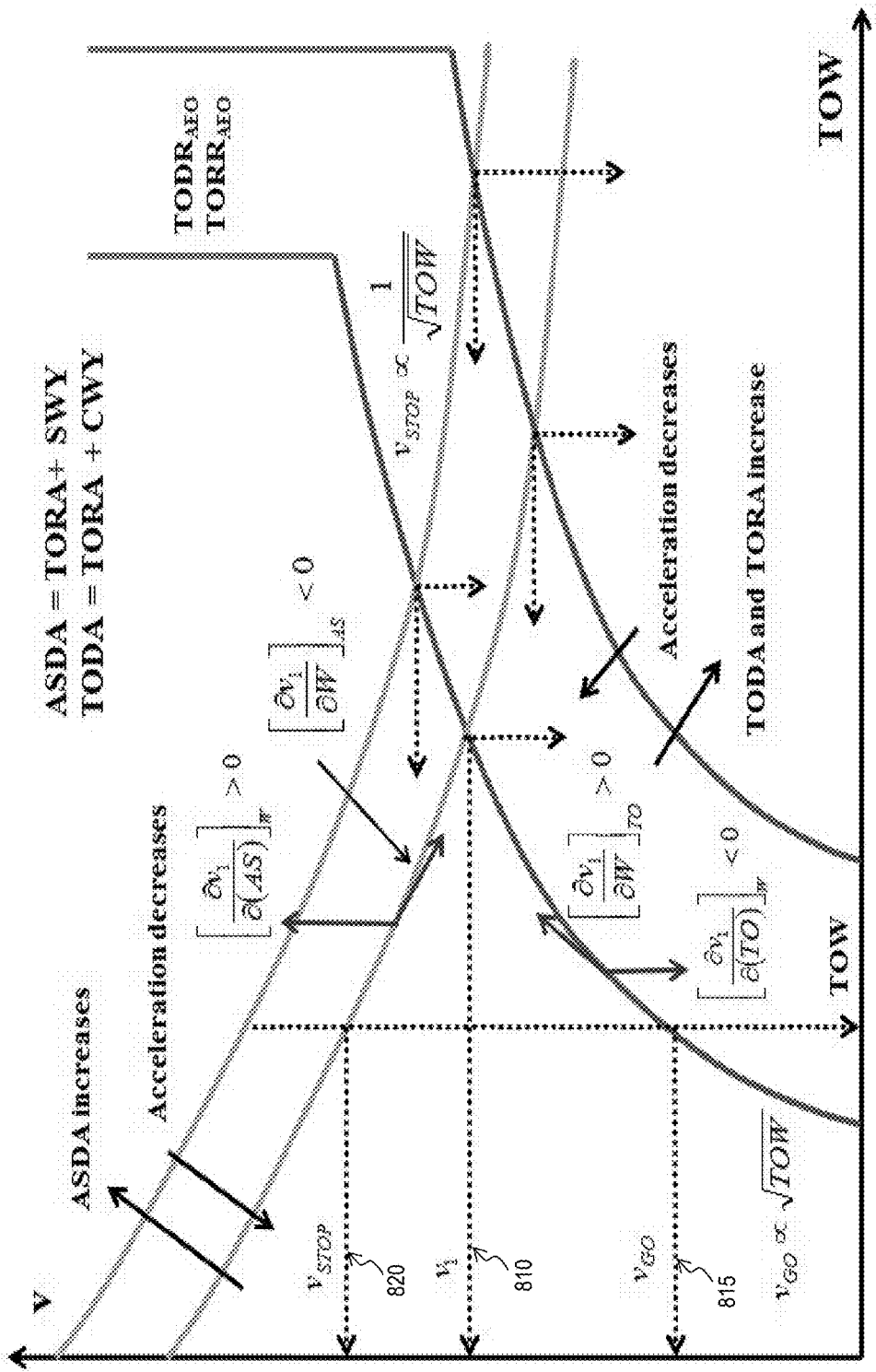
FIG. 8 illustrates the effect 801 of weight, available stopping and takeoff distances ASDA and TODA, runway slope and condition (e.g., dry, wet, contaminated) on the takeoff decision/action speed V1 and possibly available range of VGO and VSTOP speeds.

FIG. 8 illustrates the effect of weight, available stopping and takeoff distances ASDA and TODA, runway slope and condition (e.g., dry, wet, contaminated) on the takeoff decision/action speed V1 and possibly available range of VGO and VSTOP speeds 801. The balanced V1 for BFL is shown as 810. The minimum airspeed from which to continue takeoff after OEI for given weight and conditions is VGO as shown in 815. The maximum airspeed from which to reject/abort/abandon takeoff due to engine failure or other abnormal events is VSTOP and is marked as 820. For takeoff weight/mass less than maximum a range of V1 airspeeds exists between VGO and VSTOP which can be chosen by operator for given aircraft type.

Figure 9:
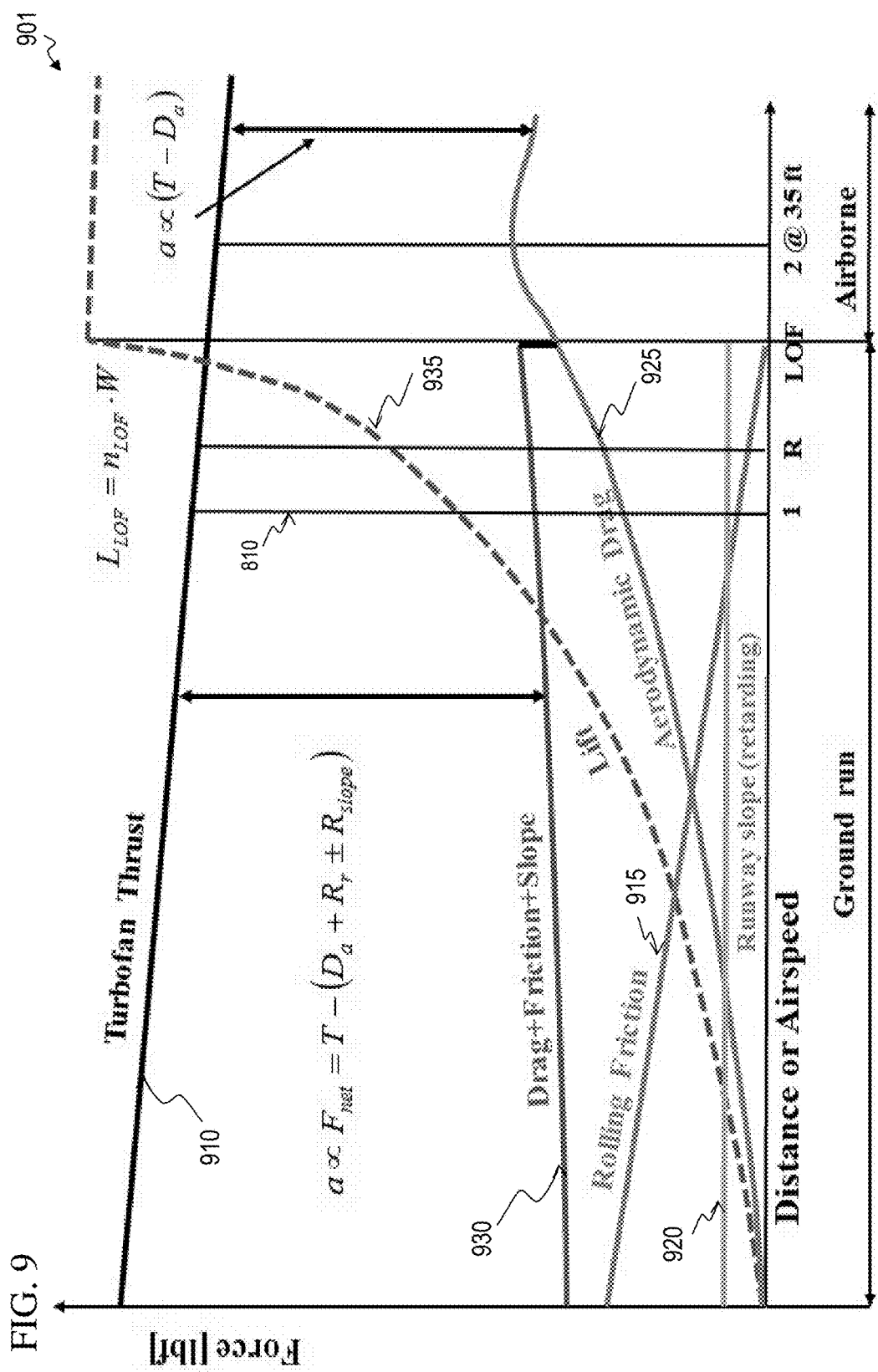
FIG. 9 illustrates various major forces 901 acting on an airplane during takeoff.

FIG. 9 illustrates various major forces acting on an airplane during takeoff, 901. Jet AEO thrust is shown as 910 (which will be reduced in the case of engine-failure). Tires rolling friction retardation force is depicted with 915. Runway slope retardation (or assistance in downslope) is illustrated constant here for simplicity and designated with 920. The ever-present aerodynamic drag for a given aircraft configuration versus airspeed is identified with 925. The summary effect of rolling friction, runway slope (positive or negative) and aerodynamic drag is identified with 930. The V1 airspeed is depicted as 810. The acceleration of the airplane in longitudinal direction will depend on the balance of these major forces. TRSS 101 has the capability to measure current and predict future acceleration thus forecasting the takeoff history before it actually occurs with the main goal to assist flight crew in making best decisions regarding safety of passengers and property.

Figure 10:
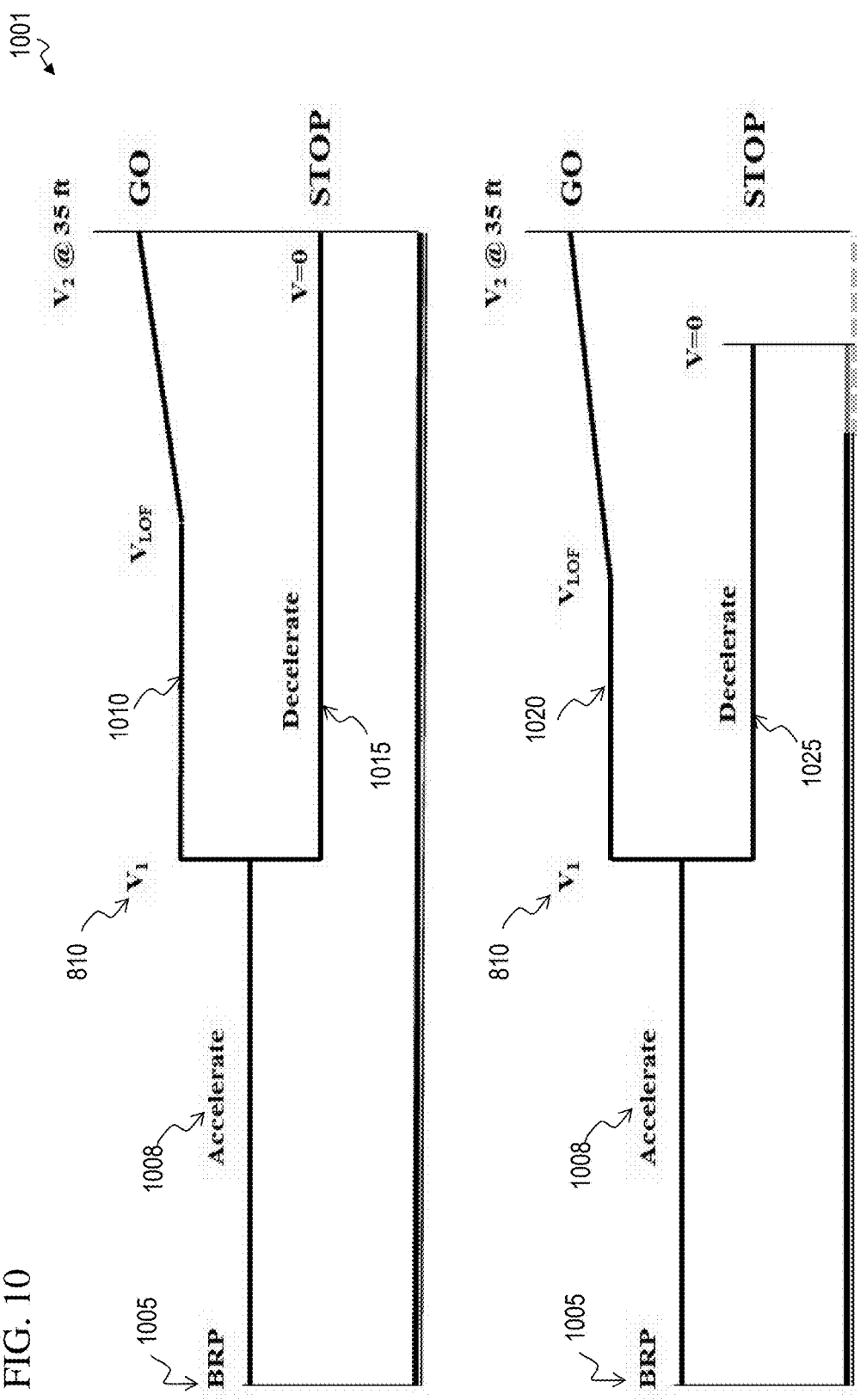
FIG. 10 is an illustration 1001 of bifurcation speed V1 810 at which the first action must be taken or to continue the takeoff or to abort/reject takeoff (RTO) for balanced (BFL) and unbalanced (BFL) field length.

FIG. 10 illustrates bifurcation takeoff decision/action speed V1 at which the first action must be taken or to continue the takeoff (after OEI) or to abort/reject takeoff (RTO) for balanced (BFL) and unbalanced (BFL) field length, 1001. The V1 speed (810) has the same meaning in both cases however the value (magnitude) may be quite different. Clearways alone will reduce V1, while stopways will increase V1. BRP 1005 (Brake Release Point) is the start of the accelerate phase 1008. Accelerate-Go or continue takeoff history is shown with 1010 for BFL and accelerate-stop history is shown as 1015. In the case of the UBFL takeoff, the accelerate-go is shown with 1020 and accelerate-stop distance with 1025 and they are not of the same length. TRSS 101 takes into account all declared runway (TORA) extensions to estimate critical speeds in pre-takeoff phase and then monitors and advises pilots in real-time during actual takeoff for arbitrary runway and atmospheric (wind, temperature, pressure) conditions.

Figure 11:
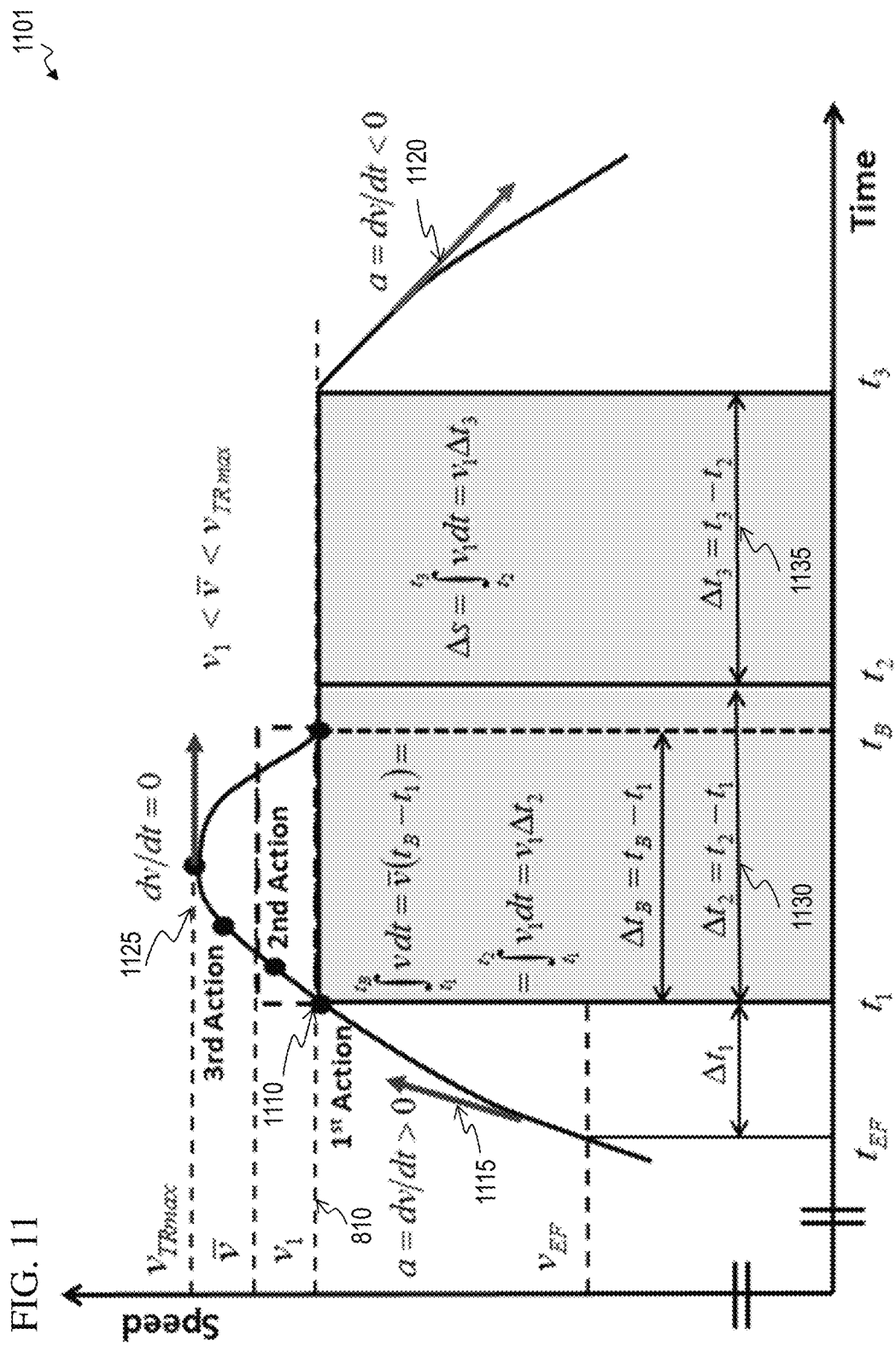
FIG. 11 illustrates time-distance-speed-acceleration transition/dynamic zone during aborted takeoff sequence, 1101.

FIG. 11 illustrates time-distance-speed-acceleration transition/dynamic zone during aborted takeoff sequence, 1101. The V1 airspeed is again depicted with identifier 810 which requires first action to be taken to stop the aircraft (1110) which usually implies applying brakes first. The local accelerations (accelerate phase) depicted with 1115 and deceleration (stopping phase) identified with 1120 are measured in real time but also predicted using TRSS sensors before the airplane has reached that point in time and space. The maximum speed reached during takeoff 1125 is measured and the time for transition (1130) is measured too. For operational regulations, a mandatory coasting period of about two seconds is currently added to demonstrated test pilot performance as depicted here with 1135. The TRSS 101 will calculate the intensity of deceleration required to meet the safety standards, will inform the crew and in full-authority mod can apply maximum possible retarding forces (Appendix B) to prevent overrun. TRSS 101 will also estimate if the transition zone progress is too slow and if the pilots are not reacting rapidly enough and will make operation decisions and inform the flight crew. See Appendix C for more details.

Figure 12:
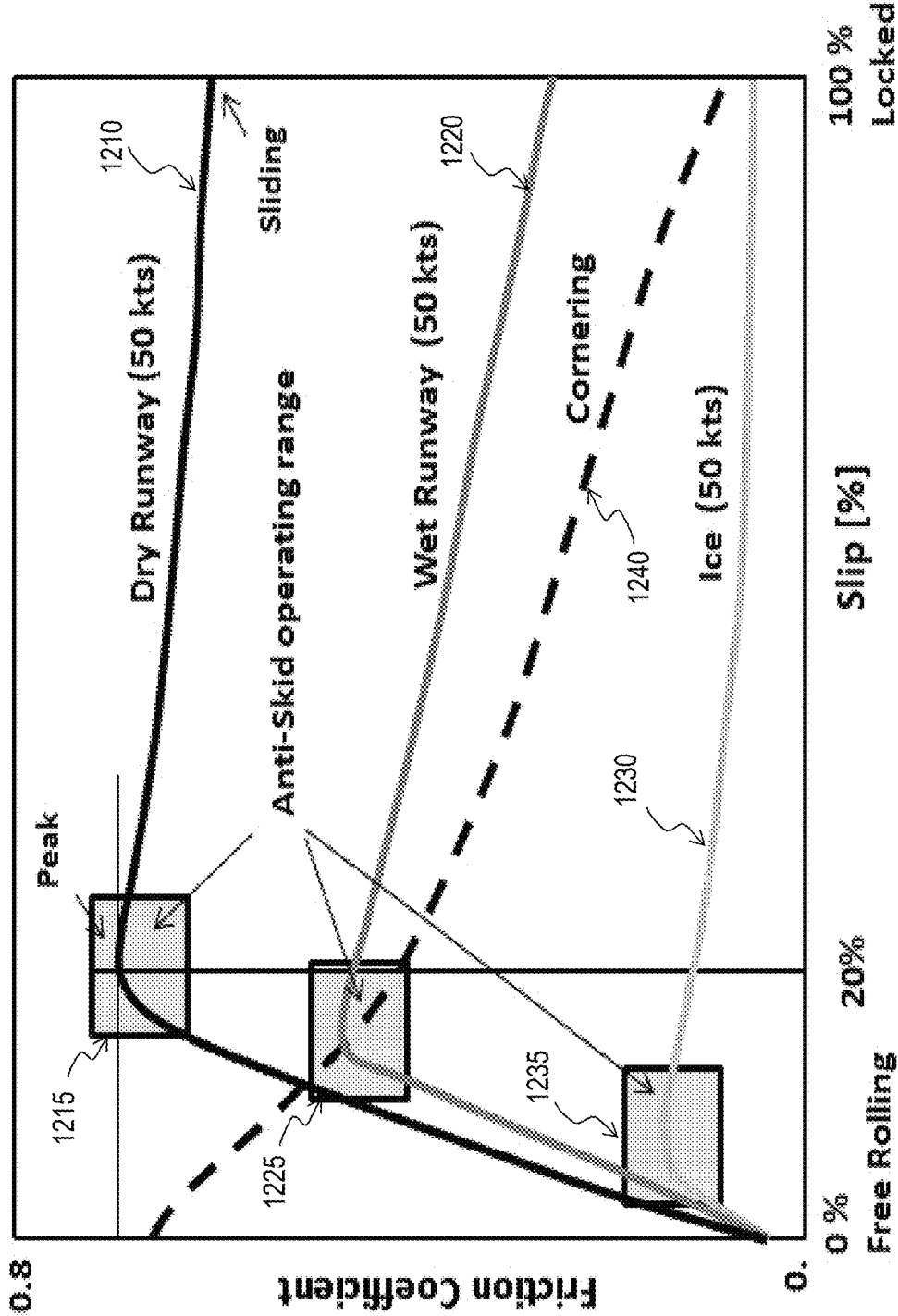
FIG. 12 illustrates the coefficient of friction (COF) versus tire slip (percentage) for a variety of runway conditions (dry, wet, contaminated) and optimal anti-skid operational ranges 1201 as a function of speed and surface conditions.

FIG. 12 illustrates friction coefficient (COF) versus tire slip (percentage) for a variety of runway conditions (dry, wet, icy) and optimal anti-skid operational ranges as a function of speed and surface conditions, 1201. Designation 1210 depicts the COF for representative hard dry runway with typical aircraft tires as a function of tire slip 1210. The maximum COF is typically around 20% slip and the range of fully-modulated Anti-Skid operational range is designated with 1215. Nominally wet hard runway has COF as a function of tire slip designated with 1220. The peak is reached at about 15% slip with the appropriate anti-skid operation designated with 1225. The icy runway (no snow piles) will experience COF versus tire slip behavior depicted by 1230 and the corresponding anti-skid operation with 1235. Not only is the COF much reduced at high slips. But the same occurs to the tire cornering capabilities shown with 1240. The cornering capability is especially important during operations on slippery (contaminated, hydroplaning, etc.) runways with crosswind and with or without thrust reversers. In some embodiments, the TRSS 101 has machine-learning capabilities and stores the COF data from previous accelerations/decelerations to make better future predictions.

Figure 13:
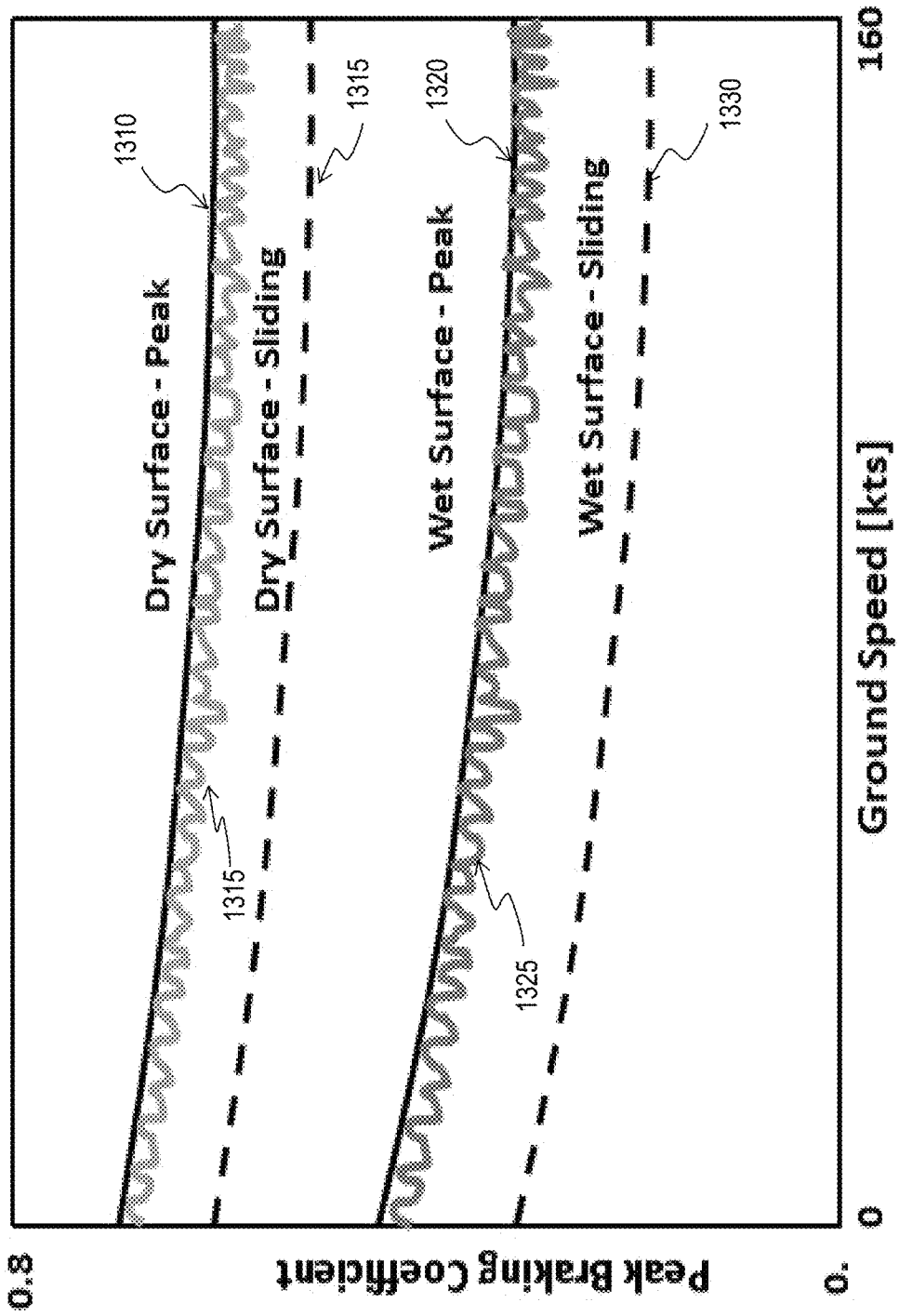
FIG. 13 illustrates schematics of operation 1301 of a fully-modulated anti-skid system (hydraulic pressure changed rapidly by anti-skid valves as a function of forward aircraft speed and runway condition).

FIG. 13 illustrates schematics of operation of a fully-modulated anti-skid system (hydraulic pressure changed rapidly by anti-skid valves as a function of forward aircraft speed and runway condition), 1301. The theoretical maximum COF for a dry hard runway versus airplane speed is designated with 1310. The sliding (locked tire/wheel or 100% slip) COF versus airplane speed is designated with 1320. The fully-modulated anti-skid system's real performance and actual temporal COF as function of speed is designated with 1315. The anti-skid efficiency may be 85-90% and the theoretical background is provided in Appendix C. Antiskid operation on wet hard surfaces is illustrated for the theoretical maximum COF versus airplane speed with 1320, the respective fully-locked sliding COF is designated with 1330, and the effective anti-skid operation with 1325. In some embodiments, the TRSS 101 has the capability to compare actual anti-skid operation with the historical data to provide better performance estimates.

Figure 14:
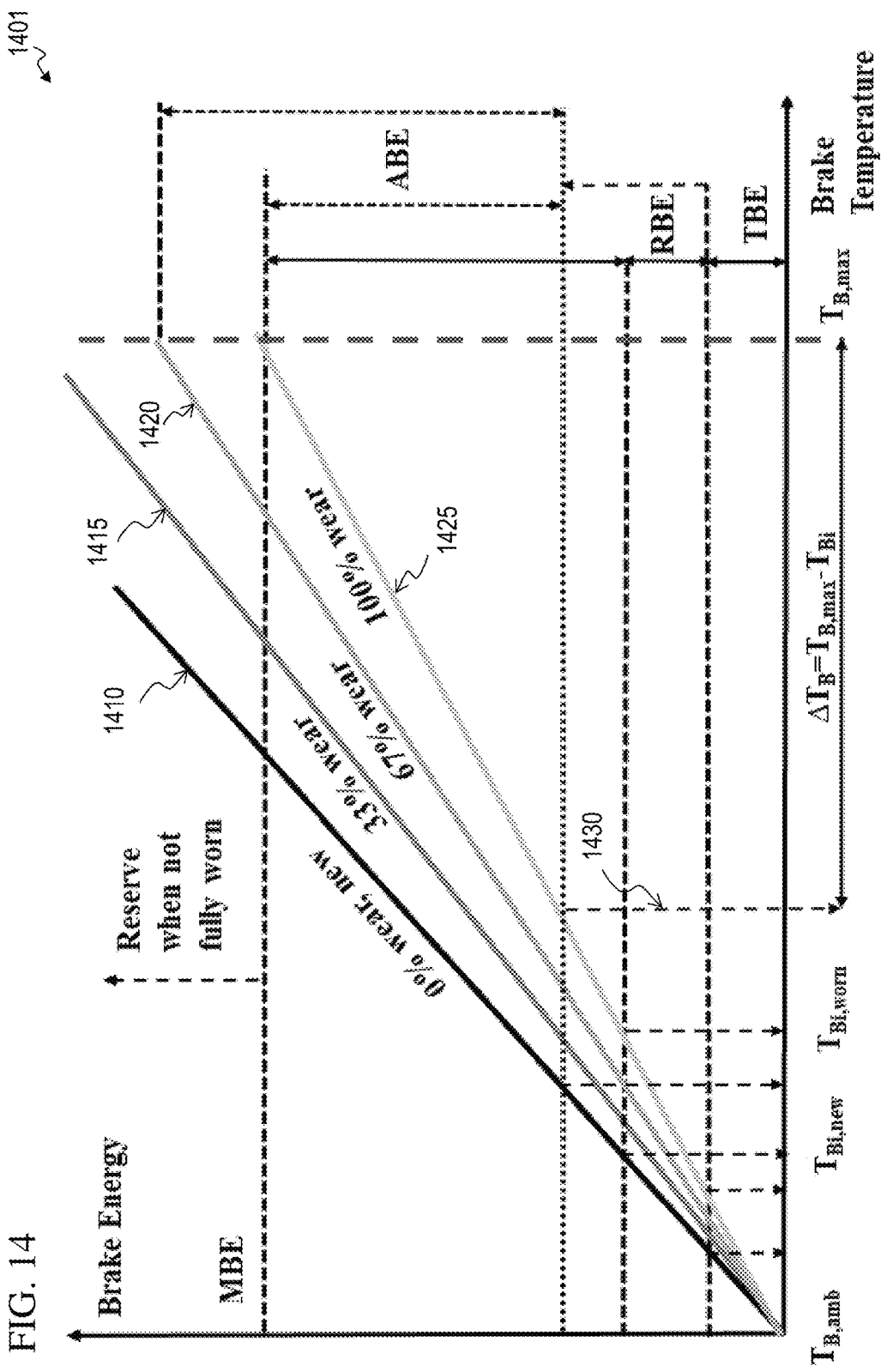
FIG. 14 illustrates brake computer functionality 1401 in measuring the existing/current Available Brake Energy/Capacity (ABE). As brakes wear and due to residual brake energy and taxiing brake energy less actual ABE exists in every runway operation.

FIG. 14 illustrates brake computer functionality in measuring the existing/current Available Brake Energy/Capacity (ABE) (see Appendix A). As brakes wear with time and use and due to the residual brake energy (previous landing and takeoff with or without cooling) and required taxiing brake energy before takeoff, less actual ABE exists for runway operations, 1401. Based on the level of brake tear and wear as depicted with characteristics 1410 (0% wear), 1415 (33%), 1420 (67%), and 1425 (100% wear), existing representative brake temperatures 1430, tire conditions and pressure, in some embodiments, the brake computer part of the TRSS 101 calculates the current ABE which is then fed into the main TRSS processor to evaluate whether the brakes with or without thrust reversers will be capable of stopping the aircraft upon landings or RTOs depending on the exact aircraft speed and location from which braking starts.

Figure 15:
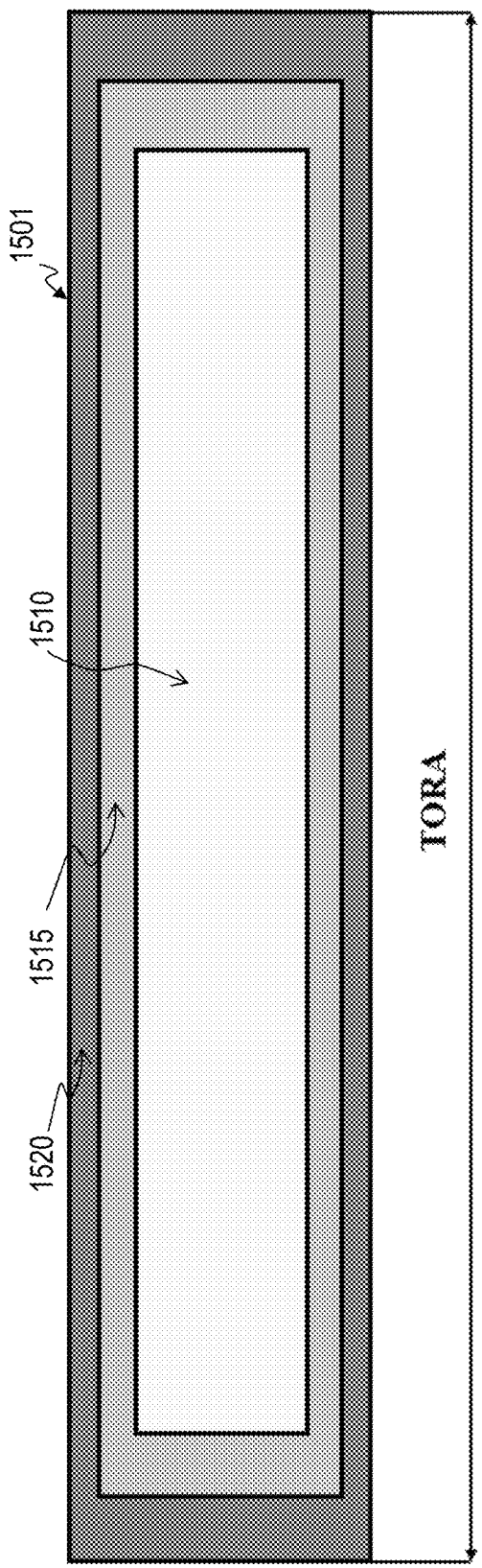
FIG. 15 illustrates the safe (green), caution (yellow) and hazardous (red) runway zones 1501 in longitudinal and lateral directions in terms of the total energy and actual aircraft runway location.

FIG. 15 illustrates system 1501 in which the safe (green) 1510, caution (yellow) 1515 and hazardous (red) 1520 runway zones in terms of the total aircraft energy and actual aircraft runway location for both lateral and longitudinal motion. TRSS 101 gives appropriate audio and visual warnings and calculates percentages of each zone safety factors. That implies that aircraft crew will see green visual indicators as long as the aircraft is in the green runway zone (1510) with both lateral and longitudinal speeds, accelerations, and jerks below respective limits. Similarly, will be for the yellow (caution) zone (1515) if the lateral and longitudinal dynamic parameters are above normal, but still below unsafe. The red zone is warning or red zone (1520), in which case the airplane has too much lateral and/or longitudinal total energy and is in unsafe zone. The task of TRSS 101 is to prevent an aircraft of ever operating in the red (unsafe) zone and at least it will give timely audio and visual warnings. In some embodiments, ultimately, TRSS 101, in the full-authority mode, will take over the control of the aircraft and apply corrective actions (thrust, reversers, brakes, spoilers, nose-wheel steering, flight-control deployment, etc.) to avoid operating in such regime.

Figure 16:
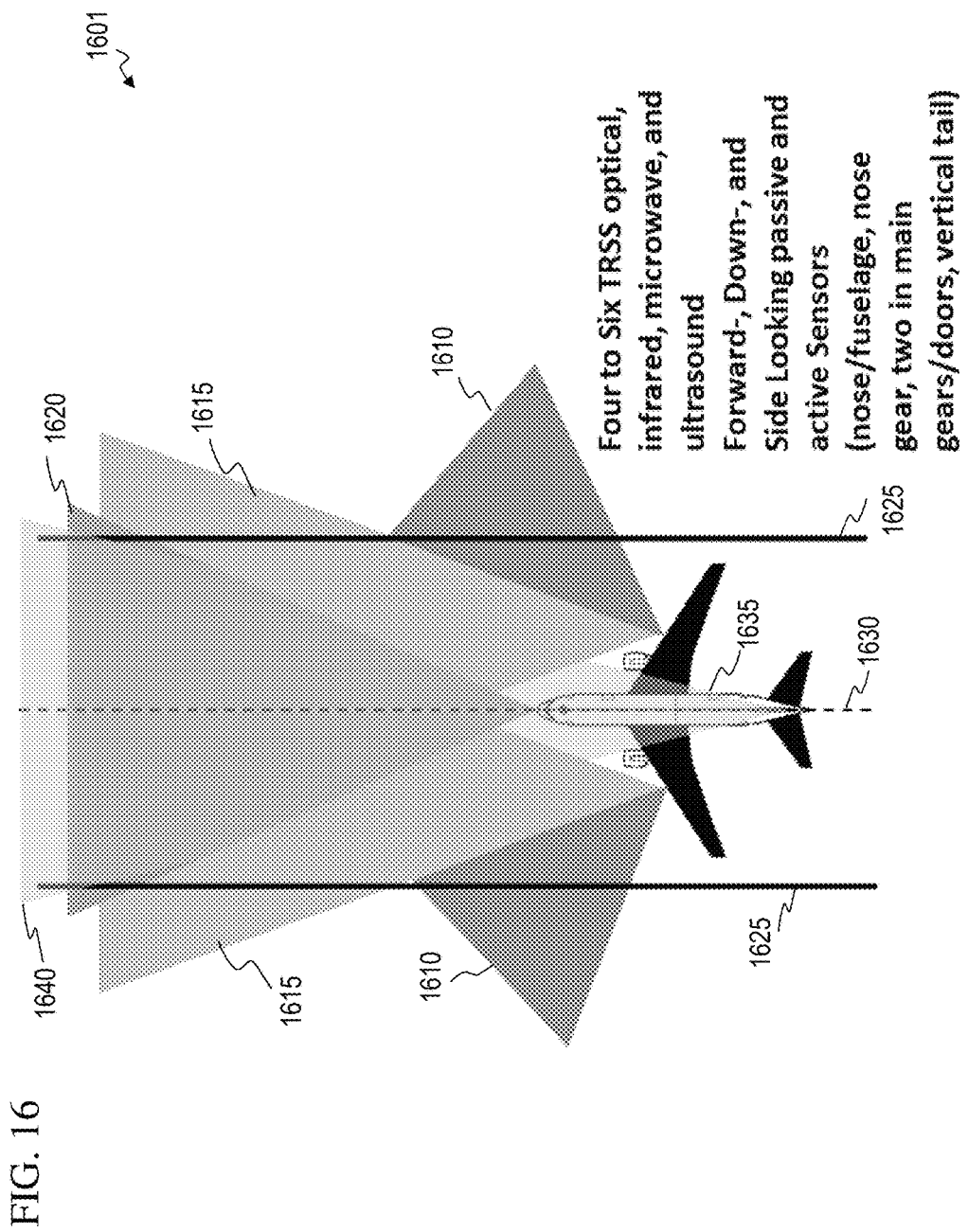
FIG. 16 illustrates top view of an airplane 1635 during takeoff or landing roll 1601 with various optical, infrared (microwave), and ultrasonic sensors transceiving (sending and receiving) reflected and backscattered electromagnetic and acoustic density waves.

FIG. 16 illustrates the top view of an airplane during takeoff or landing roll with various optical, infrared (microwave), and ultrasonic sensors transmitting (sending and receiving) reflected and backscattered electromagnetic and acoustic density waves, 1601. An aircraft is designated as 1635, runway as 1625 and runway centerline as 1630. Various electromagnetic and acoustic transmitters scan and interrogate runway surface condition and contamination sideways, down and forward. The multi-sensor unit of TRSS 101 located in the main landing gears is scanning the runway surface and runway edges as shown with 1610. In some embodiments, TRSS sensors located in main landing gears also scan and interrogate runway surface in forward direction as shown with 1615. In some embodiments, TRSS sensors located in the nose, and extendable in the upper fuselage and vertical tail scan and interrogate runway surface condition in the forward and down direction as shown in 1620. In some embodiments, vertical tail (fin) extendible TRSS multi-sensor boom scans down and far-field forward for distant measurements as identified with 1640. In some embodiments, several multi-sensor units located in various parts provide for required redundancy.

Figure 17:
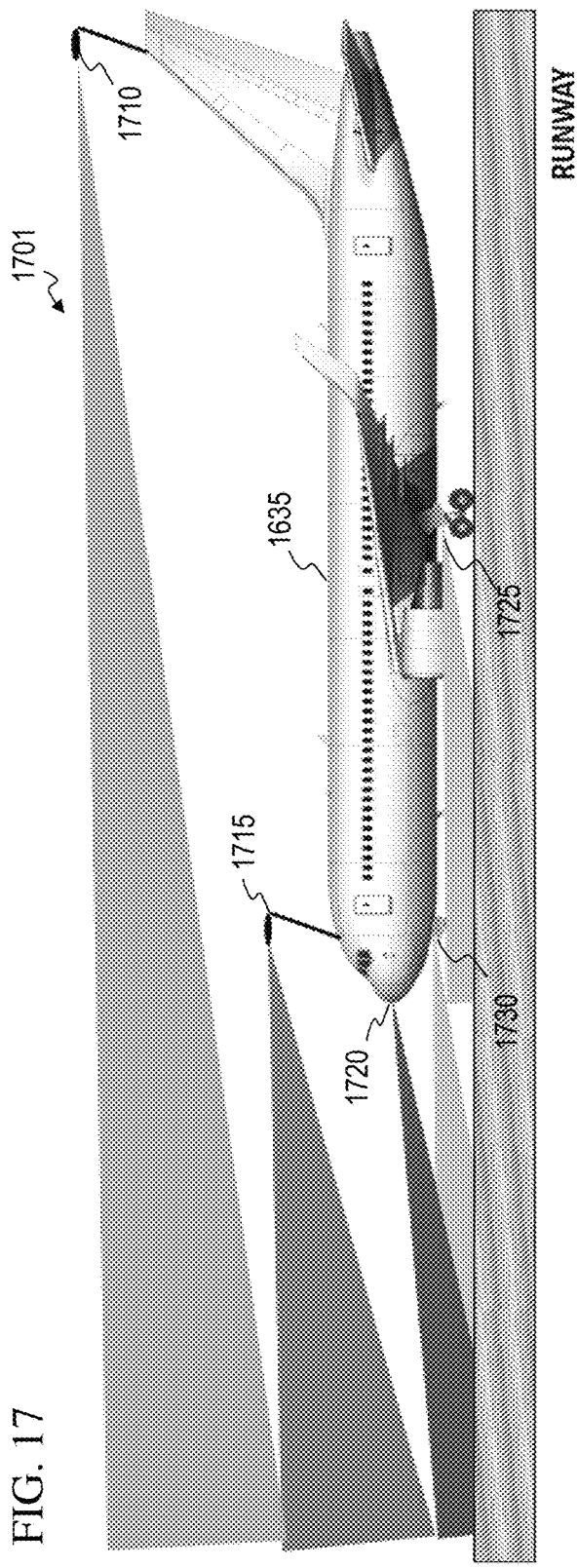
FIG. 17 is an illustration 1701 of a transport-category airplane 1635 during ground roll (takeoff or landing) with various electromagnetic and acoustic sensors located in the retractable nose and main landing gears and retractable booms in the vertical tail, nose cone (by radome) and upper forward fuselage (above cockpit).

FIG. 17 illustrates a transport-category airplane during ground roll (takeoff or landing) with various electromagnetic and acoustic sensors located in the retractable nose and main landing gears and retractable booms in the vertical tail, nose cone (by radome) and upper forward fuselage (above cockpit), 1701. The aircraft is again depicted with 1635. The vertical stabilizer (fin) extendable down- and forward-looking TRSS multi-sensors perform continuous real-time runway condition measurement as depicted with 1710. The upper-fuselage extendable TRSS boom for forward and down-looking runway sensors is depicted with 1715. TRSS sensors in the nose are depicted in 1720. The TRSS sensors in the main gear (at least two or one on each landing gear) is depicted in 1725. The nose gear located TRSS sensors that extend and retract with the landing gear are depicted in 1730. In some embodiments, some sensors are looking further down the runway than the others with necessary overlaps and cross-checks.

Figure 18:
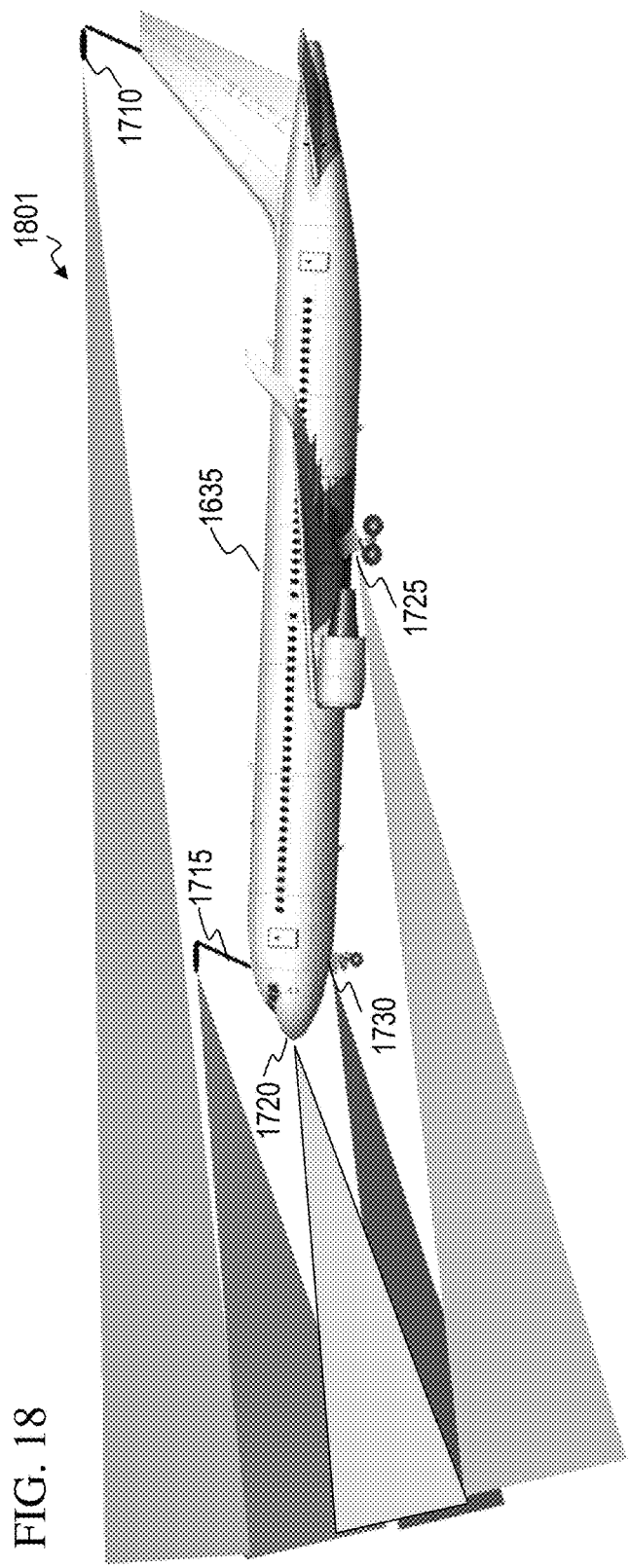
FIG. 18 is an illustration 1801 a transport-category airplane 1635 during landing approach configuration. Various electromagnetic and acoustic sensors extend as the retractable nose and main landing gears are extended as well as retractable booms in the vertical tail, upper forward fuselage (above cockpit), and the nose cone sensor door opens.

FIG. 18 illustrates a transport-category airplane during landing approach configuration, 1801. The same elements are depicted as in FIG. 17 above. Typically, such sensors can be deployed upon gear extension some 5 to 10 miles ahead of landing runway. In some embodiments, The ultrasonic sensors in the nose cone assembly are made to operate even before the landing gear is deployed and after the landing gear is retracted for prolonged bird-strike prevention.

Figure 19:
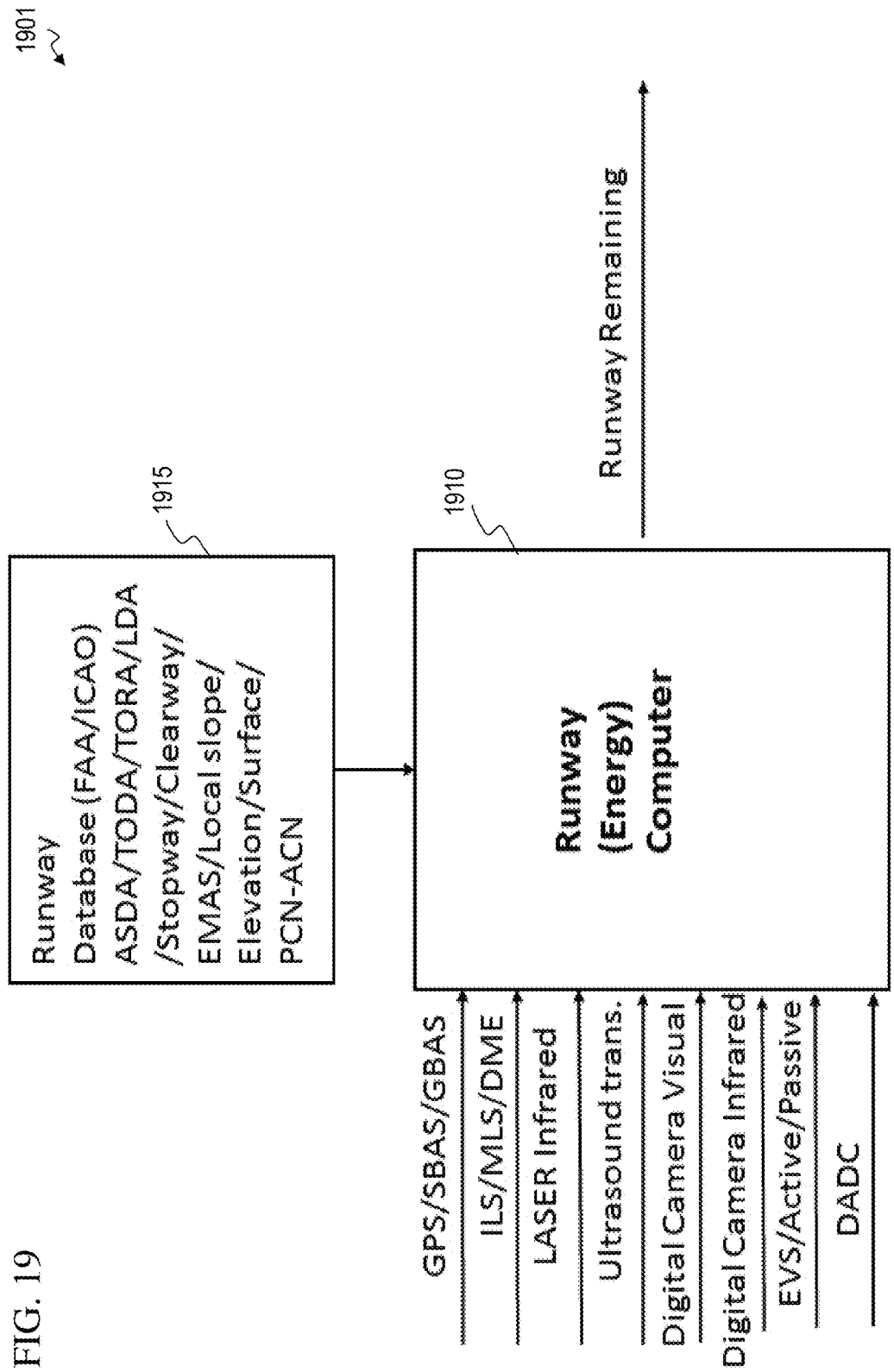
FIG. 19 is a block-diagram schematic of the total runway energy computer 1901.

FIG. 19 is a block-diagram schematic of the total runway energy computer system 1901. In some embodiments, total runway energy computer system 1901 includes runway energy computer 1910, which receives information from up-to-date database of complete runway geometry 1915 and the number of sensors and transducers (e.g., sensors 171 of FIG. 1A) that evaluate runway surface condition (laterally and longitudinally). In some embodiments, some or all of runway computer 1910 is implemented in an on-board aircraft-based runway computer 161 that also receives input from sensors 171 of FIG. 1A, as well as the traditional existing sensors such as (digital) air data computers (DADC) and a plethora of various navigational signals.

Figure 20:
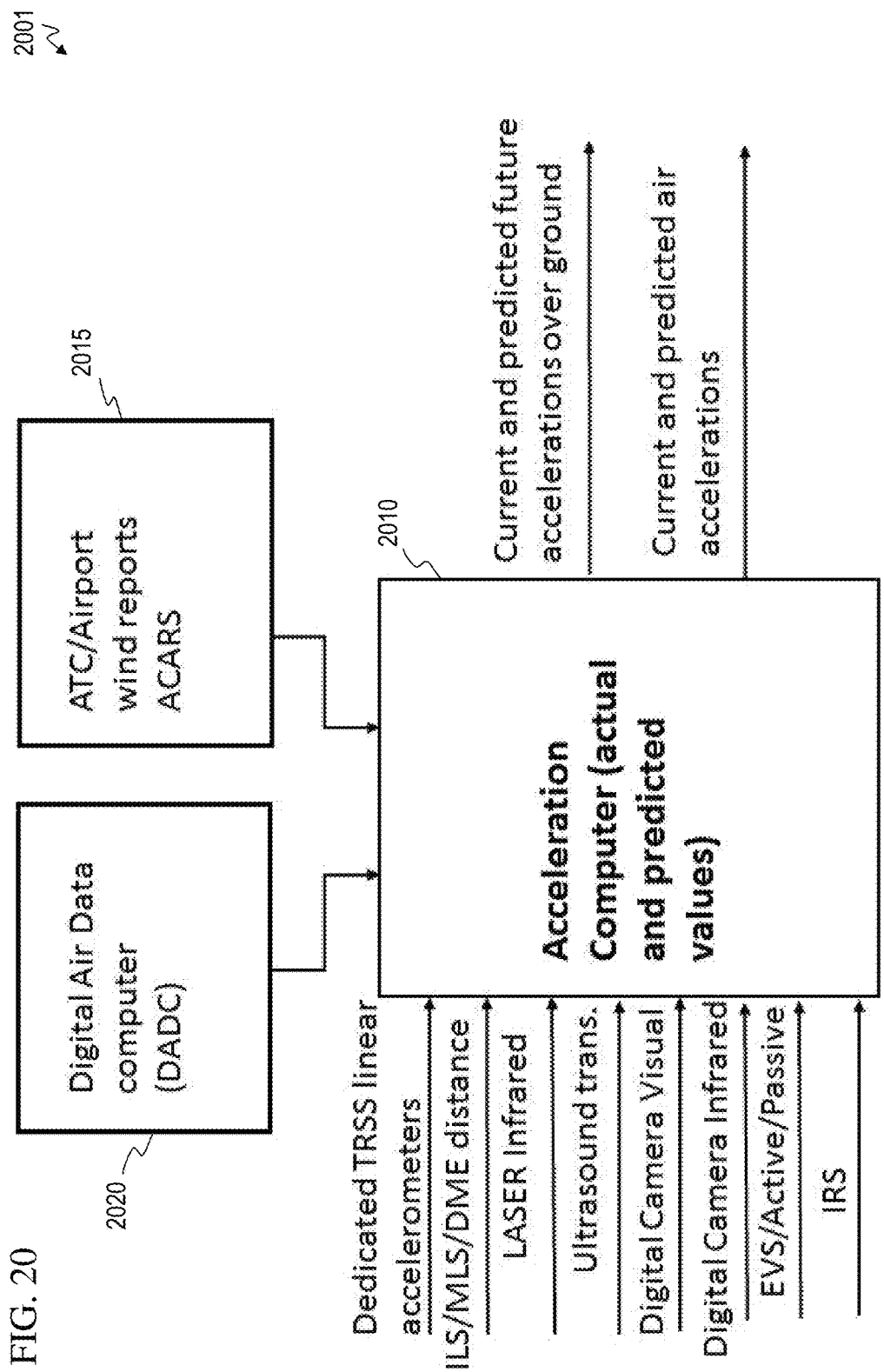
FIG. 20 is a block-diagram schematic of an airplane-acceleration (current and estimated future) computer 2001.

FIG. 20 is a block-diagram schematic of an airplane-acceleration (current and estimated) computer system 2001. Lateral and longitudinal current and predicted (or forecast) force and acceleration are calculated by airplane acceleration computer 2010. In some embodiments, in addition to currently measured and estimated future accelerations, jerk, speeds, and lateral, runway locations are also calculated. Aircraft air data is received by computer 2010 from digital air data computer (DADC) 2020. Wind data as reported by air-traffic controller (ATC) 2015 or received through ACARS or other electronic means in block 2015 is coupled to airplane acceleration computer 2010.

Figure 21:
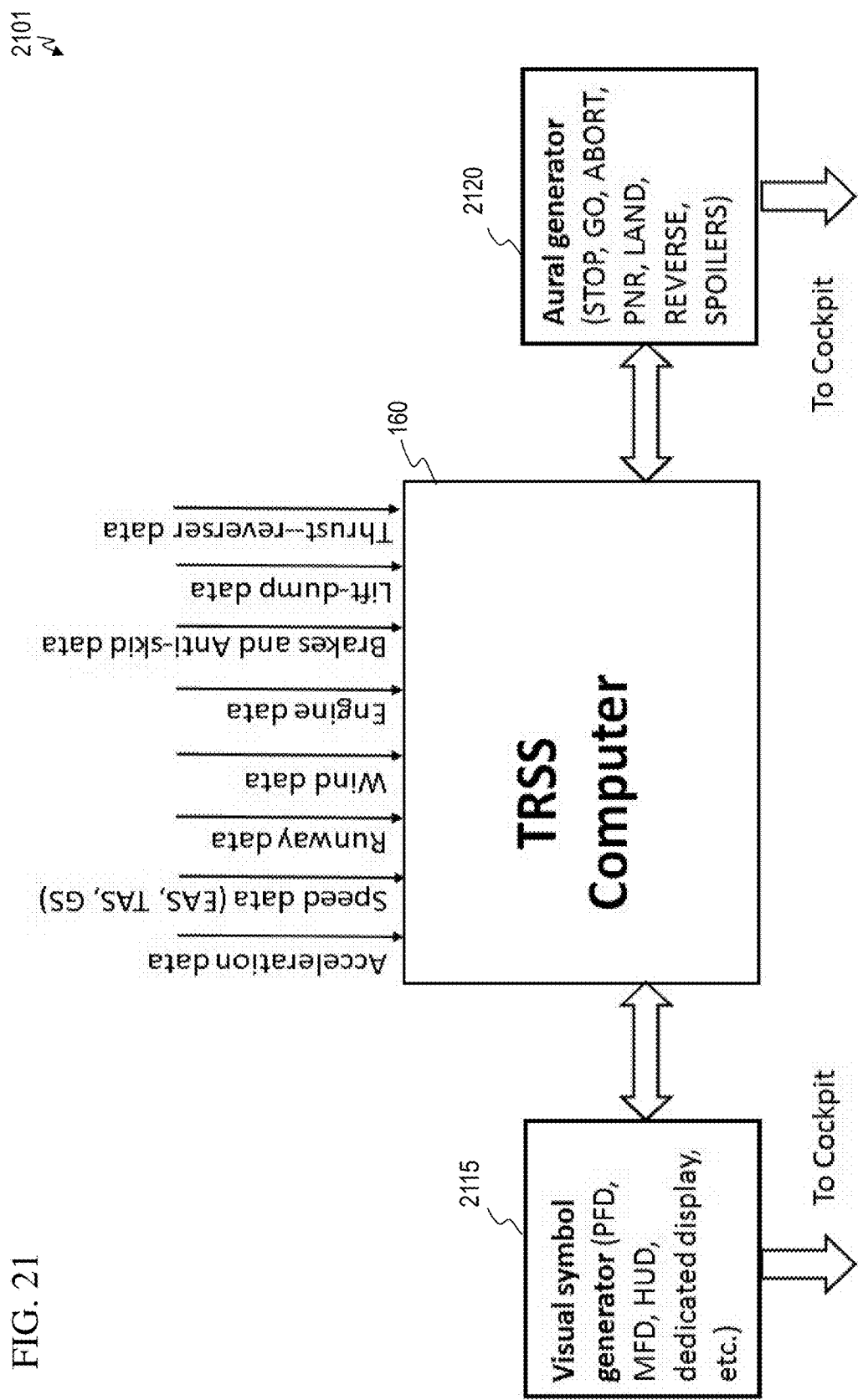
FIG. 21 is a block-diagram schematic of a TRSS (Total Runway Safety System) computer 2101.

FIG. 21 is a block-diagram schematic of TRSS (Total Runway Safety System) computer system 2101. Block 160 represents one TRSS main computer (several exist for redundancy in system 160 shown in FIG. 1A). In some embodiments, data for audio warnings are sent to audio processor 2115 for presentation to the cockpit flight crew as audio output. In some embodiments, the visual cockpit signals coming from TRSS computer 160 are processed in a visual computer 2120 and presented to the cockpit flight crew as visual output.

Figure 22:
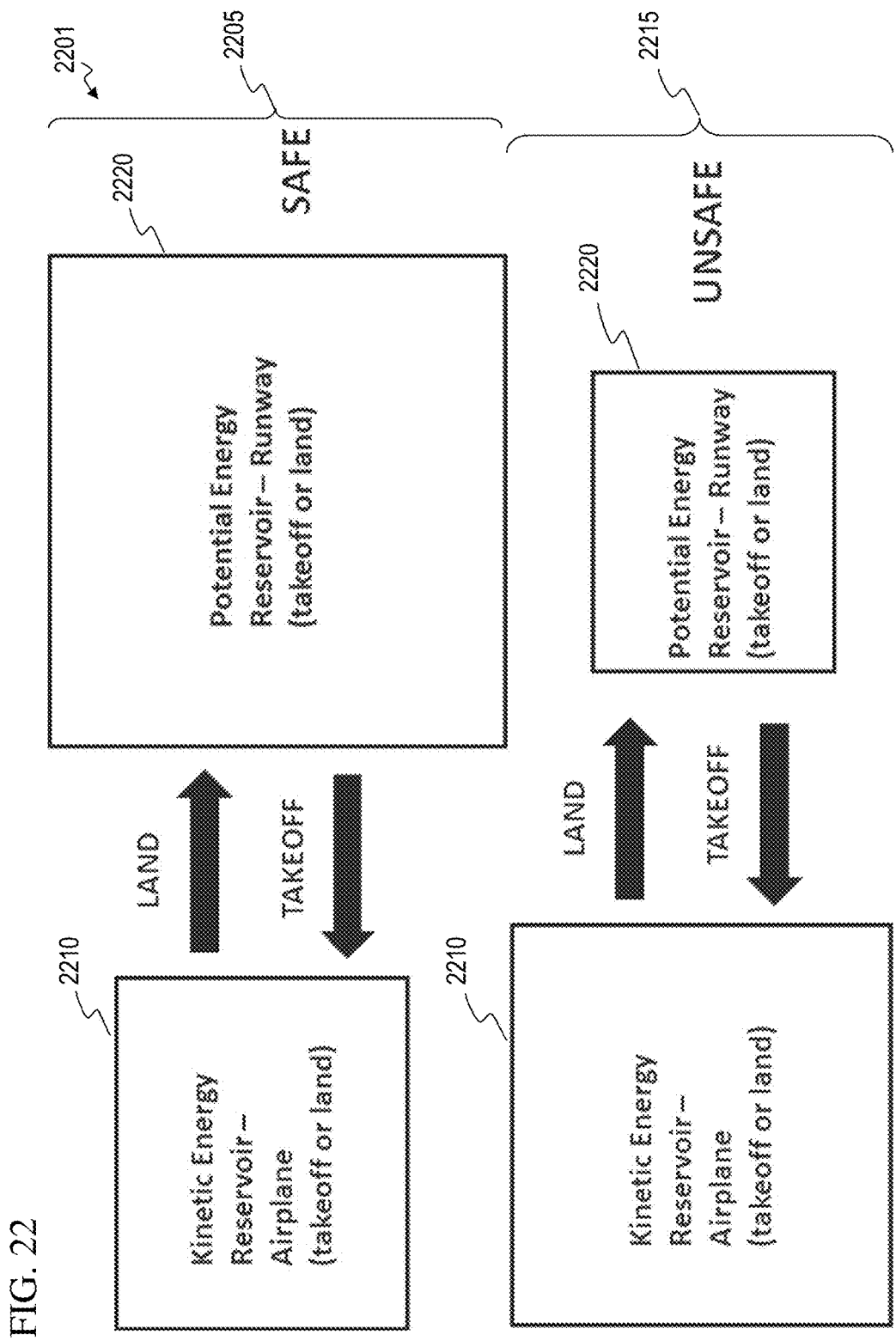
FIG. 22 is a block-diagram schematic of an aircraft-runway total energy measurement, monitor, manage system (ARTEMS) 2201, where aircraft kinetic energy is compared to runway energy-absorbing or potential capacity (takeoffs or landings). TRSS 101 continually measures and compares these two essential energy reservoirs to make proper decisions (see Appendix D).

FIG. 22 is a block-diagram schematic of a generic aircraft-runway total energy measurement, monitor, and manage system 2201 (ARTEMS) used by TRSS 101. In some embodiments, the aircraft total (kinetic plus potential) energy is continually compared to runway total energy absorbing or potential energy capacity for both takeoffs and landings. TRSS 101 continually measures and compares these two essential energy reservoirs to make proper decisions. The SAFE condition 2205 is met as long as the runway absorbing or delivering energy capacity 2220 is larger than aircraft total energy 2210. The UNSAFE condition 2215 is when the runway energy reservoir 2220 is smaller than the available aircraft total energy reservoir 2210.

Figure 23:
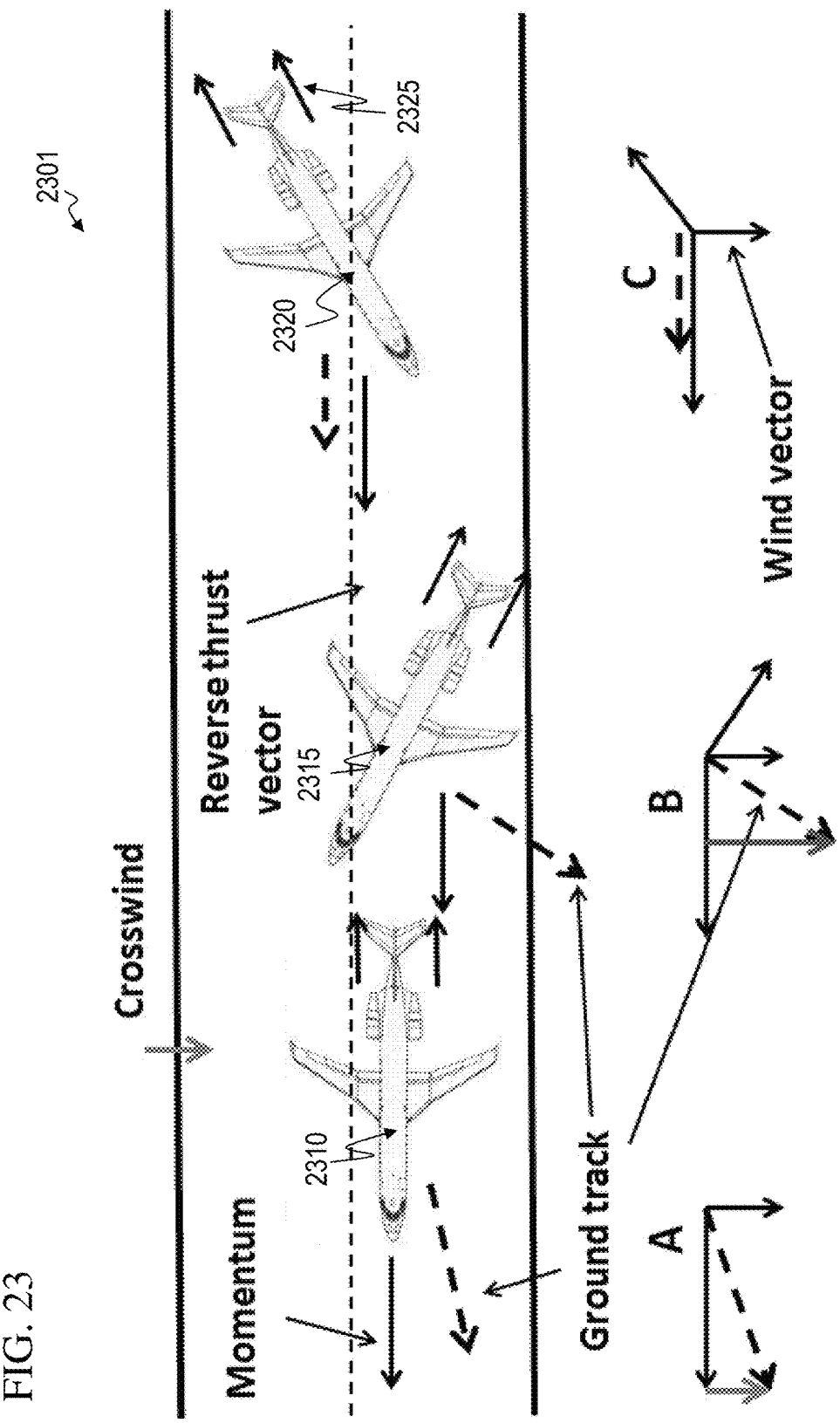
FIG. 23 illustrates an example of TRSS operation 2301 during landing roll when AEO with thrust reversers applied and crosswind. Visual and aural commands and control options are given to pilot to avoid veer-off and overrun.

FIG. 23 illustrates an example of TRSS operation during landing roll when AEO with thrust reversers applied and crosswind, 2301. Three scenarios exist. If the thrust reverse is used with no yaw control on a slippery runway (scenario A) crosswind will displace landing airplane laterally possibly causing veer-off (2310). A common but incorrect pilot response is to turn (yaw) into crosswind in which case the thrust reversers will pull the airplane sideways even faster resulting in high-speed veer-off (2315) as in scenario B. Getting out of reverse to rectify lateral control problems could likely cause overrun (longitudinal motion). The TRSS 101 calculates the scenario C based on the crosswind intensity, current and expected down-the runway COF and expected accelerations (lateral and longitudinal) and advise pilot on how much rudder steering is required downwind actually so that thrust reversers oppose crosswind while in the same time provide effective deceleration longitudinally (2320). Thrust reverse force vectors from AEO is depicted as 2325. Visual and aural commands and required control commands are provided to pilot to avoid veer-off and overrun. In this hazardous landing scenario both veer-off and overrun can be prevented.

Figure 24:
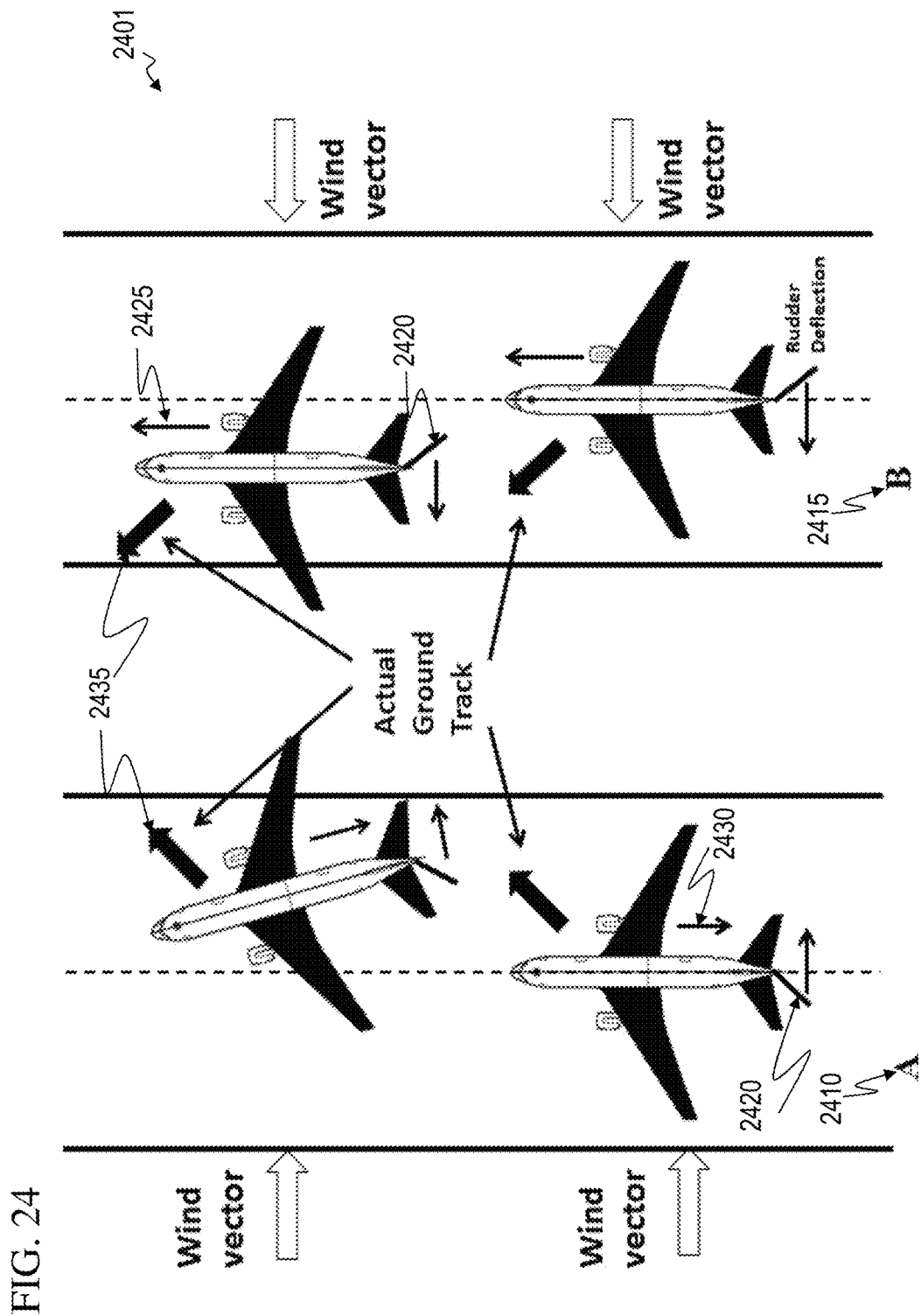
FIG. 24 illustrates an example of TRSS operation 2401 during takeoff and landing roll with sudden engine failure (OEI) with and without asymmetric thrust reversers and crosswind. Visual and aural commands are given to pilot to avoid veer-off and overrun.

FIG. 24 illustrates an example of TRSS operation and real-time intervention during landing or aborted takeoff (A) and continuing takeoff (B) rolls with sudden engine failure (OEI), slippery runway and strong crosswind, 2401. Asymmetric thrust reversers may be used during landing and rejected (aborted) takeoff deceleration. Scenario A (2410) describes the situation during landing roll when OEI or rejected takeoff (STOP) due to engine failure. Scenario B (2415) describes the situation during continued (GO) takeoff after engine failure. The combination of crosswind and slippery runway in both scenarios historically had and can cause veer-offs and overruns. The rudder displacement in both scenarios is depicted with 2420, the OEI forward thrust is depicted with 2425 and the OEI reverse thrust with 2430. The various veering-off ground tracks are represented with an identifier 2435. TRSS 101 is performing real-time calculations of current and expected lateral and longitudinal accelerations and providing real-time control command recommendations to the flight crew. Visual and aural signals and control commands are provided to pilots to avoid veer-off and/or overrun. In full-authority mode, TRSS 101 can, in an emergency situation, override pilot inputs and apply optimal control inputs deemed best to protect aircraft occupants and property.

In some embodiments, the present invention provides a new and non-obvious comprehensive airplane safety system designed to assist flight crew in all runway operations thus preventing takeoff and landing incidents and accidents.

In some embodiments, the present invention provides a total runway safety system (TRSS 101) that measures (e.g., aircraft landing and takeoff parameters and conditions), monitors (e.g., compares over time the measured landing and takeoff parameters and conditions to predetermined values and combinations of values and spatial and temporal histories of the parameters), manages (e.g., complies with ATC clearances and instructions, automatically calculates and outputs data for each of a plurality of aircraft relative to takeoff and landing operations (e.g., predictions and inadequate braking due to brakes wear levels)), controls (e.g., automatically adjusts aircraft control inputs, thrust reversers lift-dump spoilers, brakes and anti-skid, flight control surfaces) and informs flight crew and control tower (e.g., automatically notifies humans in the respective current and following aircraft on the progress of takeoffs and landings and of any hazardous runway conditions, control tower and ATC).

In some embodiments, TRSS 101 measures, monitors, manages, and informs flight crew of longitudinal and lateral runway tracks thus likely preventing overruns and veer-offs during takeoffs and landings.

In some embodiments, TRSS 101 continuously in real-time estimates, monitors and informs the flight crew about the point-of-no-return (PNR) or commit-to-land (NTSB) runway point after which no aborted landing and go-around should be attempted.

In some embodiments, TRSS 101 implements a worldwide gravitational model in performance calculations using International Gravitational Formula ($\gamma=9.78$ $(1+0.0053 \sin^2 \lambda - 0.0000058 \sin^2 2\lambda)$ where $\gamma$ is theoretical gravity and $\lambda$ is latitude, wherein the units of Earth's gravity ~9.81 ms$^{-2}$— this well-known formula is revised occasionally). Some embodiments also include gravitational anomalies obtained from satellite measurements (and, e.g., Bouguer mass effect (additional rock attraction): $g\uparrow 0.0419$ $\rho$ milliGals/meter ($\rho$=density), which gives a Bouguer Gravity Anomaly $\Delta gB$ $\Delta gB=g-\gamma+0.3086$ $h-0.0419$ $\rho h$ where g=measured gravity $\gamma$=theoretical gravity at the latitude of the measurement h=height above mean sea level, which is interpretable geologically—see www.geos.ed.ac.uk/~whaler/gravity_lectures/Gravity %20Formulae.pdf).

In some embodiments, TRSS 101 includes or takes into account change of weight effect during takeoffs and landings for more accurate accelerations and performance predictions In some embodiments, TRSS 101 incorporates a rocket-propulsive thrust component due to fuel consumption and thrust changes with airspeed in all jet engine thrust computations.

In some embodiments, TRSS 101 includes planned/scheduled regulatory runway alignments and rolling-takeoff distances for calculations and incorporates real-time value for actual takeoff operations thus diminishing available distances.

In some embodiments, TRSS 101 incorporates any runway geometry with available stopways and clearway and the existence of arrestor systems (such as EMAS). Balanced (BFL) and unbalanced field (UBFL) takeoff computations and estimates are performed and appropriate V1 speed chose.

In some embodiments, TRSS 101 makes available to flight crew a range of airspeeds between VGO and VSTOP if the takeoff weight is less than maximum and V1 speed is maximum stopping speed and minimum go speed when OEI.

In some embodiments, TRSS 101 makes estimates of rolling and braking coefficients of friction (COF) based on processing of fast digital optical and infrared thermal images (down and forward) during day and night operations.

In some embodiments, TRSS 101 uses backscatter of infrared laser beams and passive/active microwave radiometers to independently evaluate groundspeed and the spatially-distributed reflectivity/emissivity and temperature of the runway surface thus also making estimates of the surface conditions, roughness and contamination which affects rolling and braking efforts and ultimately predicts acceleration history.

In some embodiments, TRSS 101 uses infrared laser, optical and microwave radiometers the TRSS uses infrared laser, optical and microwave radiometers to gain information about remaining runway length, current groundspeed, actual and predicted acceleration.

In some embodiments, TRSS 101 uses digital visual and active/passive infrared cameras for evaluation of runway surface and thus estimates of future accelerations.

In some embodiments, TRSS 101 uses ultrasound beams to accomplish the same task as visual and infrared digital cameras and is especially suitable for poor weather conditions.

In some embodiments, TRSS 101 integrates information received from a variety of electronic navigation and guidance systems such GPS (SBAS/GBAS), ILS/MLS/DME, onboard IRS, and ATC/airport reported runway braking conditions with the infrared laser (forward- and downlooking), ultrasound and digital images to find the best estimates of the runway remaining, current speed, acceleration, and jerk (surge).

In some embodiments, TRSS 101 includes dedicated runway computer and aircraft computers that process runway potential energy storage and the kinetic energy storage of an aircraft.

In some embodiments, TRSS 101 includes several (redundancy) dedicated TRSS computers that uses sophisticated estimators of future acceleration levels to assist flight crew in real-time regarding critical operational decisions.

In some embodiments, TRSS 101 computer relays information to visual and voice generators that are presented in the cockpit to flight crew.

In some embodiments, TRSS 101 is one of four TRSS units located in transport category airplane certified under FAR 25. One in each gear assembly (two in main underwing gears and one in nose gear). The fourth is located in the nose (usually close to radome) and is protected by a door in normal flight. As the landing gear is deployed for landing or is extended during takeoff each TRSS system works independently and provides redundancy. After gear retraction, the TRSS is disabled and no longer needed until landing. In this way TRSS units are protected during most of the flight time and not exposed to high dynamic pressures and risk damage due to debris.

In some embodiments, TRSS 101 measures the current side and down-the-runway expected acceleration and friction coefficients and feeds them into predictive software, which inform pilots and make the best choice in terms of safety to protect airplane and occupants.

In some embodiments, TRSS 101 uses dedicated brake energy computers to continuously measure, monitor, and evaluate available braking energy (ABE) capacity based on the existing state of brake wear and representative brake temperatures for rejected takeoff (RTO), normal landings, and aborted landing (PNR) computations. The brake computer also monitors tire wear, temperature and pressure. The brake computer also exchanges information with anti-skid computers/systems.

In some embodiments, TRSS 101 fully evaluates acceleration transition zone (Appendix C and E) and takes it into consideration issuing appropriate warnings and information during rejected takeoffs (accelerate-stop) or rejected landings (decelerate-go).

In some embodiments of the TRSS, ultrasonic emitters (side and forward looking) are used to reduce and minimize bird strike hazards of landing and taking off aircraft which is greatest at low altitudes and close to the ground/airport/runway.

In some embodiments, the present invention provides a total runway safety system (TRSS) apparatus 101 that includes a first plurality of sensors 181 located on an aircraft 180 that measure a first set of parameters of real-time spatial distribution of runway surface conditions relevant to a landing; a first computer system 161 (in some embodiments, first computer system 161 is located on the aircraft 180; while in other embodiments, first computer system 161 is a distributed system that is partly in the aircraft and partly remote from the aircraft, or indeed in some embodiments, completely remote from aircraft 180 except for audio-visual output unit 188) and communicatively coupled to the first plurality of sensors and to a second plurality of sensors 170 spatially separated from the aircraft 180 that measure a second set of parameters relevant to the landing, wherein the onboard computer system 161 is configured to elicit and receive the first and second sets of parameters from the first and second plurality of sensors, and wherein the onboard computer system is configured to automatically calculate a prediction of whether the landing can be done within safety parameters without overrunning runway longitudinally or veering off runway laterally and to output indications of the prediction to flight crew in the aircraft 180.

In some embodiments, the first computer system 161 is communicatively coupled to a remote computer system 163 located off the aircraft, and wherein the first 161 computer system elicits and receives pre-processed data from the remote computer system 163 (such as data from one or more of the sensors 170, which is preprocessed into a form more convenient for the first computer system 161 to use) that is used in the automatic calculation of whether the landing can be done within the safety parameters.

In some embodiments, at least some of the first and second pluralities of sensors 181, 170 measure current lateral and longitudinal accelerations and wind vector, and wherein the first computer system 161 is configured to automatically calculate and display a prediction of future lateral and longitudinal runway track and predictions of future lateral and longitudinal accelerations.

In some embodiments, the first plurality of sensors 181 located on the aircraft measure a third set of parameters relevant to a takeoff, wherein the first computer system 161 is configured to elicit and receive the third set of parameters from the first plurality of sensors, and wherein the first computer system is configured to automatically calculate a prediction whether the takeoff can be done within safety parameters without overrunning runway longitudinally or veering off runway laterally and to automatically adjust aircraft controls based on the comparisons of the first and second sets of measured landing and takeoff parameters and conditions to predetermined values and combinations of values.

In some embodiments, the first plurality of sensors located on the aircraft measure a third set of parameters relevant to a takeoff, the computer system is configured to elicit and receive the third set of parameters from the first plurality of sensors, and the computer system is configured to automatically calculate a prediction whether the takeoff can be done within safety parameters without overrunning runway longitudinally or veering off runway laterally and to output indications of the prediction to flight crew in the aircraft.

In some embodiments, the first computer system is communicatively coupled to a remote computer system located off the aircraft, and the first computer system elicits and receives pre-processed data from the remote computer system that is used in the automatic calculation of whether the takeoff can be done within the safety parameters.

In some embodiments, the first computer system is configured to automatically calculate a prediction whether the landing can be done within safety parameters without overrunning runway longitudinally or veering off runway laterally and to automatically adjust aircraft controls based on the prediction.

In some embodiments, the first computer system is configured to calculate takeoff and landing operational control and performance airspeeds based on atmospheric, environmental, weather, and runway conditions for the aircraft's mass and configuration.

In some embodiments, the first computer system is configured to continuously calculate real-time estimates of point-of-no-return and commit-to-land runway locations after which no aborted landing and go-around should be attempted for existing and actual runway geometry and layout.

In some embodiments, the first computer system uses a world-wide gravitational model in performance calculations using International Gravitational Formula, and also uses gravitational anomaly data obtained from satellite measurements.

In some embodiments, the first computer system includes in its calculations a change-of-weight effect during takeoffs and landings for more accurate acceleration and performance predictions.

In some embodiments, the first computer system includes in its calculations actual engine net thrust as a function of airspeed, temperature, pressure and humidity.

In some embodiments, the first computer system includes in its calculations planned and scheduled regulatory runway alignments and rolling-takeoff distances for calculations and incorporates real-time and actual values for actual takeoff operations thus accounting for actually diminished available distances.

In some embodiments, the first computer system includes in its calculations runway geometry with available stopways and clearway and the existence of arrestor systems (such as EMAS) and performs balanced (BFL) and unbalanced (UBFL) takeoff computations and estimates and chooses appropriate speeds based on the takeoff computations.

In some embodiments, the first computer system outputs to the flight crew a range of airspeeds between VGO and VSTOP if the takeoff weight is less than maximum and V1 speed is maximum stopping speed and minimum go speed when OEI.

In some embodiments, the first computer system outputs information on overspeed or improved V2 takeoff when the aircraft is climb and obstacle limited but not field length limited.

In some embodiments, the first computer system makes continuous and updated estimates of runway spatially-distributed rolling and braking coefficients of friction based on processing of fast digital optical and infrared thermal images (side, down and forward) during day and night operations.

In some embodiments, the first computer system uses received data from backscatter of infrared laser beams and microwave radiometers to independently evaluate groundspeed and the spatially-distributed reflectivity, emissivity and temperature of the runway surface and also makes estimates of the surface conditions, roughness and contamination types and thicknesses that affect rolling and braking efforts and ultimately predicts lateral and longitudinal acceleration history.

In some embodiments, the first computer system uses infrared laser, optical and microwave radiometers to gain information about remaining runway length, current groundspeed, actual and predicted acceleration.

In some embodiments, the first computer system receives image data from digital visual and infrared cameras for evaluation of runway surface and estimates future accelerations based on the evaluated image data of spatially distributed contaminants (wet, ice, snow, etc.).

In some embodiments, the first computer system receives acoustic ultrasound data for evaluation of runway surface and estimates future accelerations based on the evaluated acoustic ultrasound data that is suitable for poor weather conditions.

In some embodiments, the first computer system integrates information received from a plurality of electronic navigation and guidance systems including GPS and air-traffic control (ATC) and airport-reported runway braking conditions with forward-looking and down-looking infrared laser data, ultrasound data, and digital images to determine improved estimates of runway remaining, current speed, acceleration, and jerk.

In some embodiments, the first computer system receives data from dedicated runway computers that continuously evaluate runway potential-energy capacity and the kinetic energy storage of the aircraft, performs energy calculations, and issues specific advisory information to flight crew based on the energy calculations.

In some embodiments, the first computer system receives data from dedicated TRSS computers that use sophisticated estimators of future acceleration levels to assist flight crew in real-time regarding critical operational decisions.

In some embodiments, the first computer system relays information to visual and voice generators that present visual and audio information in the cockpit to the flight crew.

In some embodiments, the aircraft is a transport-category airplane certified under Federal Aviation Regulations part 25 (FAR 25), and wherein the first computer system is connected to a plurality of TRSS multi-sensor units located in the aircraft, including a multi-sensor unit in each landing-gear assembly of the aircraft, a multi-sensor unit located in a nose of the aircraft, and a multi-sensor unit located on a vertical tail location, wherein as landing gear are deployed for landing the plurality of multi-sensor units are extended, and after gear retraction the multi-sensor units are disabled and no longer needed until next landing, in order that the multi-sensor units are protected during most of the flight time and not exposed to high dynamic pressures and damage risk due to debris.

In some embodiments, the first computer system calculates the current side and forward down-the-runway expected acceleration and friction coefficients and feeds them into predictive software, which inform pilots and make the best choice in terms of safety to protect airplane and occupants.

Some embodiments further include one or more anti-skid computer systems; and one or more brake computers that continuously evaluate available braking energy (ABE) capacity based on existing state of brake wear and representative brake temperatures, and wherein the apparatus performs rejected takeoff (RTO), normal landings, and aborted landing (PNR) computations based on the ABE evaluation, wherein the one or more brake computers monitor tire wear, temperature and pressure, and wherein the one or more brake computers also exchange information with the one or more anti-skid computer systems.

In some embodiments, the first computer system evaluates an acceleration transition zone during rejected takeoffs and rejected landings and takes these evaluations into consideration when issuing subsequent warnings and information.

Some embodiments further include a plurality of side-looking and forward looking ultrasonic transceivers, and wherein the first computer system receives information from the ultrasonic transceivers to reduce and minimize bird-strike hazards during landing and takeoff aircraft which are greatest at low altitudes.

In some embodiments, the present invention provides a total runway safety system (TRSS) method that includes measuring a first set of parameters of spatial distribution of runway surface conditions relevant to a landing using a first plurality of sensors located on an aircraft; eliciting and receiving the first set of parameters from the first plurality of sensors into a first computer system; eliciting and receiving a second set of parameters into the first computer system from a second plurality of sensors that are spatially separated from the aircraft and that measure a second set of parameters relevant to the landing; automatically calculating, using the first computer system, a prediction of whether the landing can be done within safety parameters without overrunning runway longitudinally or veering off runway laterally; and outputting indications of the prediction to flight crew in the aircraft.

Some embodiments of the method further include communicating between the first computer system and a remote computer system located off the aircraft; eliciting and receiving pre-processed data from the remote computer system; and using the received pre-processed data in the automatic calculation of whether the landing can be done within the safety parameters.

Some embodiments of the method further include using at least some of the first and second pluralities of sensors, measuring current lateral and longitudinal accelerations and wind vector; and automatically calculating and displaying, by the first computer system, a prediction of future lateral and longitudinal runway track and predictions of future lateral and longitudinal accelerations.

Some embodiments of the method further include using the first plurality of sensors located on the aircraft, measuring a third set of parameters relevant to a takeoff; eliciting and receiving the third set of parameters from the first plurality of sensors into the first computer system; and automatically calculating, by the first computer system, a prediction whether the takeoff can be done within safety parameters without overrunning runway longitudinally or veering off runway laterally and to automatically adjust aircraft controls based on the comparisons of the first and second sets of measured landing and takeoff parameters and conditions to predetermined values and combinations of values.

Some embodiments of the method further include using the first plurality of sensors located on the aircraft to measure a third set of parameters relevant to a takeoff; eliciting and receiving the third set of parameters from the first plurality of sensors into the first computer system; and automatically calculating, by the first computer system, a prediction whether the takeoff can be done within safety parameters without overrunning runway longitudinally or veering off runway laterally and to output indications of the prediction to flight crew in the aircraft.

Some embodiments of the method further include using the first plurality of sensors located on the aircraft to measure a third set of parameters relevant to a takeoff; eliciting and receiving the third set of parameters from the first plurality of sensors into the first computer system; communicating between the first computer system and a remote computer system located off the aircraft, and eliciting and receiving pre-processed data from the remote computer system into the first computer system; automatically calculating, by the first computer system, a prediction whether the takeoff can be done within safety parameters without overrunning runway longitudinally or veering off runway laterally; and outputting indications of the prediction to flight crew in the aircraft.

Some embodiments of the method further include using the first computer system to automatically calculate a prediction whether the landing can be done within safety parameters without overrunning runway longitudinally or veering off runway laterally; and automatically adjusting aircraft controls based on the prediction.

Some embodiments of the method further include using the first computer system to calculate takeoff and landing operational control and performance airspeeds based on atmospheric, environmental, weather, and runway conditions for the aircraft's mass and configuration.

Some embodiments of the method further include using the first computer system to continuously calculate real-time estimates of point-of-no-return and commit-to-land runway locations after which no aborted landing and go-around should be attempted for existing and actual runway geometry and layout.

Some embodiments of the method further include using a world-wide gravitational model for performance calculations using International Gravitational Formula in the first computer system, and also using gravitational anomaly data obtained from satellite measurements.

Some embodiments of the method further include including, in calculations by the first computer system, a change-of-weight effect during takeoffs and landings for more accurate acceleration and performance predictions.

Some embodiments of the method further include including, in calculations by the first computer system, actual engine net thrust as a function of airspeed, temperature, pressure and humidity.

Some embodiments of the method further include including, in calculations by the first computer system, planned and scheduled regulatory runway alignments and rolling-takeoff distances for calculations and incorporates real-time and actual values for actual takeoff operations thus accounting for actually diminished available distances.

Some embodiments of the method further include including, in calculations by the first computer system, runway geometry with available stopways and clearway and the existence of arrestor systems (such as EMAS) and performs balanced (BFL) and unbalanced (UBFL) takeoff computations and estimates and chooses appropriate speeds based on the takeoff computations.

Some embodiments of the method further include outputting, from the first computer system to the flight crew, a range of airspeeds between VGO and VSTOP if the takeoff weight is less than maximum and V1 speed is maximum stopping speed and minimum go speed when OEI.

Some embodiments of the method further include outputting, from the first computer system to the flight crew, information on overspeed or improved V2 takeoff when the aircraft is climb and obstacle limited but not field length limited.

Some embodiments of the method further include making, by the first computer system, continuous and updated estimates of runway spatially-distributed rolling and braking coefficients of friction based on processing of fast digital optical and infrared thermal images (side, down and forward) during day and night operations.

Some embodiments of the method further include using, by the first computer system, received data from backscatter of infrared laser beams and microwave radiometers to independently evaluate groundspeed and the spatially-distributed reflectivity, emissivity and temperature of the runway surface, and calculating estimates of the surface conditions, roughness and contamination types and thicknesses that affect rolling and braking efforts and ultimately predicting lateral and longitudinal acceleration.

Some embodiments of the method further include using, by the first computer system, infrared laser, optical and microwave radiometers to gain information about remaining runway length, current groundspeed, actual and predicted acceleration.

Some embodiments of the method further include receiving image data from digital visual and infrared cameras on the aircraft; evaluating runway surface, by the first computer system, based on the received image data; and estimating, by the first computer system, future accelerations based on the evaluated image data.

Some embodiments of the method further include receiving acoustic ultrasound data from ultrasound transducers on the aircraft; evaluating runway surface, by the first computer system, based on the received acoustic ultrasound; and estimating, by the first computer system, future accelerations based on the evaluated acoustic ultrasound data, which is suitable for poor weather conditions.

Some embodiments of the method further include integrating, by the first computer system, information received from a plurality of electronic navigation and guidance systems including GPS and air-traffic control (ATC) and airport-reported runway braking conditions with forward-looking and down-looking infrared laser data, ultrasound data, and digital images to determine estimates of runway remaining, current speed, acceleration, and jerk.

Some embodiments of the method further include receiving, into the first computer system, data from dedicated runway computers that continuously evaluate runway potential-energy capacity and the kinetic energy storage of the aircraft, performing, by the first computer system, energy calculations; and issuing specific advisory information to flight crew based on the energy calculations.

Some embodiments of the method further include receiving, into the first computer system, data from dedicated TRSS computers that use sophisticated estimators of future acceleration levels to assist flight crew in real-time regarding critical operational decisions.

Some embodiments of the method further include relaying, by the first computer system, information to visual and voice generators; and presenting, from the visual and voice generators, visual and audio information in the cockpit to the flight crew.

In some embodiments of the method, the aircraft is a transport-category airplane certified under Federal Aviation Regulations part 25 (FAR 25), and wherein the first computer system is connected to a plurality of TRSS multi-sensor units located in the aircraft, including a multi-sensor unit in each landing-gear assembly of the aircraft, a multi-sensor unit located in a nose of the aircraft, and a multi-sensor unit located on a vertical tail location; extending the plurality of multi-sensor units as landing gear are deployed for landing, and retracting the multi-sensor units at gear retraction until next landing, in order that the multi-sensor units are protected during most of the flight time and not exposed to high dynamic pressures and damage risk due to debris.

Some embodiments of the method further include calculating, by the first computer system, current side and forward down-the-runway expected acceleration and friction coefficients; and feeding the coefficients into predictive software, which inform pilots and make the best choice in terms of safety to protect airplane and occupants.

Some embodiments of the method further include providing one or more anti-skid computer systems on the aircraft; providing one or more brake computers on the aircraft; using the one or more brake computers, continuously evaluating available braking energy (ABE) capacity based on existing state of brake wear and representative brake temperatures; performing rejected takeoff (RTO), normal landing, and aborted landing (PNR) computations based on the ABE evaluation; monitoring, by the one or more brake computers, tire wear, temperature and pressure; and exchanging information between the one or more brake computers and the one or more anti-skid computer systems.

Some embodiments of the method further include evaluating, by the first computer system, an acceleration transition zone during rejected takeoffs and rejected landings; and taking these evaluations into consideration, by the first computer system, when issuing subsequent warnings and information.

Some embodiments of the method further include providing a plurality of side-looking and forward-looking ultrasonic transceivers; receiving, into the first computer system, information from the ultrasonic transceivers; processing, by the first computer system, the information to detect birds; and outputting warnings to reduce and minimize bird-strike hazards during landing and takeoff.

In some embodiments, the present invention provides a total runway safety system (TRSS) apparatus that includes means located on an aircraft for measuring a first set of parameters regarding spatial distribution of runway surface conditions relevant to a landing; means (such as interface circuits and/or software) for eliciting and receiving the first set of parameters from the first plurality of sensors into an onboard computer system located on the aircraft; means (such as interface circuits and/or software) for eliciting and receiving a second set of parameters into the onboard computer system from a second plurality of sensors that are spatially separated from the aircraft and that measure a second set of parameters relevant to the landing; means (such as circuitry and/or and software) for automatically calculating, using the onboard computer system, a prediction of whether the landing can be done within safety parameters without overrunning runway longitudinally or veering off runway laterally; and means for outputting indications of the prediction to flight crew in the aircraft.

PERSONAL REFERENCES

Appendix A. Daidzic, N. E. (2017) Modelling and Computation of the Maximum Braking Energy Speed for Transport Category Airplanes. Journal of Aviation Technology and Engineering (JATE), 6(2), pp. 2-26. DOI: 10.7771/2159-6670.1154

Appendix B. Daidzic, N. E. (2016) Aircraft stopping systems, Professional Pilot, Vol. 50, No. 11, pp. 86-92.

Appendix C. Daidzic, N. E. (2016) Optimization of takeoffs on unbalanced fields using takeoff performance tool. International Journal of Aviation Aeronautics and Aerospace (IJAAA), 3(3), pp. 1-56. DOI: 10.15394/ijaaa.2016.1129

Appendix D. Daidzic, N. E. (2016) Utilization of TRSS to assist pilot's decision making process during critical runway operations, WATS 2016, World Aviation Training Conference, Rosen Shingle Creek Resort, Orlando, Fla., Paper WATS 5.3, Apr. 19-21, 2016.

Appendix E. Daidzic, N. E. (2016) Determination of rejected landing roll runway point-of-no-return and go-around in transport category airplanes. International Journal of Aviation and Aeronautics Aerospace (IJAAA), 3(1), pp. 1-31. DOI: 10.15394/ijaaa.2016.1110

F. Daidzic, N. E. (2016) Aircraft deceleration and stopping systems, 30th Annual FAA Safety Seminar at MSUM, Wings Program, Minnesota State University, Mankato, Nov. 10, 2016, Mankato, Minn., USA.

G. Daidzic, N. E. (2016) Estimation of performance airspeeds for high-bypass turbofans equipped transport-category airplanes. Journal of Aviation Technology and Engineering (JATE), 5(2), pp. 27-50. DOI: 10.7771/2159-6670.1122.

H. Daidzic, N. E. (2016) General solution of the wind triangle problem and the critical tailwind angle. The International Journal of Aviation Sciences (IJAS), 1(1), pp. 57-93.

I. Daidzic, N. E. (2016) Determining the Runway Point-of-no-Return for Landing Roll Go-Around in Transport Category Airplanes, A3IR Aviation Research Conference 2016, Chandler Ariz., Paper #1210, Jan. 14-17, 2016.

J. Daidzic, N. E. (2015) Global range of subsonic and supersonic airplanes, Professional Pilot, Vol. 49, No. 10, pp. 62-70.

K. Daidzic, N. E. (2015) Efficient general computational method for estimation of standard atmosphere parameters. International Journal of Aviation Aeronautics and Aerospace (IJAAA), 2(1), pp. 1-37. DOI: 10.15394/ijaaa.2015.1053

L. Daidzic, N. E. (2014) Improving airplane touchdown control by utilizing the adverse elevator effect, International Journal of Aviation Aeronautics and Aerospace (IJAAA), 1(4), pp. 1-32. DOI: 10.15394/ijaaa.2014.1032

M. Daidzic, N. E. (2014) A total-energy based model of airplane overspeed takeoffs. International Journal of Aviation Aeronautics and Aerospace (IJAAA), 1(3), pp. 1-25. DOI: 10.15394/ijaaa.2014.1016

N. Daidzic, N. E. (2013) Aircraft tests arrive at numbers pilots need for safe operations, Professional Pilot, Vol. 47, No. 11, pp. 100-104.

O. Daidzic, N. E. (2013) T/O overruns and veer-offs on slippery runways with crosswind, Professional Pilot, Vol. 47, No. 8, pp. 54-58.

P. Daidzic, N. E. (2012) Jet Engine Thrust Ratings, Professional Pilot, Vol. 46, No. 9, pp. 92-96.

Q. Daidzic, N. E. (2011) Point of Flare—The Last Five Seconds, Professional Pilot, Vol. 45, No. 5, pp. 110-114.

R. Daidzic, N. E. (2011) Dealing with Contaminated Runways, The Journal of Civil Aviation Training (CAT), Issue February 2011, pp. 29-32.

S. Daidzic, N. E. (2011) Some Considerations for Regional Airline Operations on Contaminated Runways, WATS 2011, World Aviation Training Conference, Rosen Shingle Creek Resort, Orlando, Fla., Paper RATS 6.3, Apr. 19-21, 2011.

T. Daidzic, N. E. (2010) Takeoff and Landing Operations on Contaminated Runways, 24th Annual FAA Safety Seminar at MSU, Wings Program, Minnesota State University, November 2010, Mankato, Minn., USA.

U. Daidzic, N. E. (2010) Landing on Contaminated Runways, 2nd Annual Meeting, Citation Jet Pilots (CJP), Sep. 1-4, 2010, Broadmoor Resort, Colorado Springs, Colo., USA.

V. Daidzic, N. E. (2010) Adverse Elevator Effect in Landing Flare, WATS 2010, World Aviation Training Conference, Rosen Shingle Creek Resort, Orlando, Fla., Paper WATS 5.3, Apr. 27-29, 2010.

W. Daidzic, N. E. (2009) Aircraft Landing Operations on Contaminated Runways and Adverse Conditions, WATS 2009, World Aviation Training Conference, Rosen Shingle Creek Resort, Paper WATS 5.2, Orlando, Fla., 28-30 Apr. 2009.

X. Daidzic, N. E. (2009) Chilling Out In The Sim: The Need For Icing Training, The Journal of Civil Aviation Training (CAT), Issue June 2009, pp. 8-13.

Y. Daidzic, N. E. (2009) Avoiding Overrun Accidents on Contaminated Runways, Professional Pilot, Vol. 43, No. 12, pp. 104-107.

Z. Daidzic, N. E. (2009) Avoiding Aircraft Icing Accidents, MidWest Flyer, Vol. 31, No. 6, October/November 2009 issue, pp. 12-16.

AA. Daidzic, N. E. (2009) Avoiding Veer-off Accidents on Contaminated Runways, Professional Pilot, Vol. 43, No. 9, pp. 54-58.

BB. Daidzic, N. E. and Shrestha, J. (2008) Airplane Landing Performance on Contaminated Runways in Adverse Conditions. Journal of Aircraft, 45(6), pp. 2131-2144. DOI: 10.2514/1.38056

CC. Daidzic, N. E. (2008) When go-around is impossible—defining the point of no return, Professional Pilot, Vol. 42, No. 12, pp. 110-113.

All references, patents and patent applications mentioned herein are incorporated by reference for all purposes.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. A total runway safety system (TRSS) apparatus comprising:
a first plurality of sensors located on an aircraft that measure a first set of parameters regarding real-time spatial distribution of runway surface conditions relevant to a landing;
a first computer system communicatively coupled to the first plurality of sensors and to a second plurality of sensors spatially separated from the aircraft that measure a second set of parameters relevant to the landing, wherein the first computer system is configured to elicit and receive the first and second sets of parameters from the first and second plurality of sensors,
wherein the first computer system is configured to automatically calculate a prediction of whether the landing can be done within safety parameters without overrunning runway longitudinally or veering off runway laterally and to output indications of the prediction to flight crew in the aircraft, and
wherein at least some of the first and second pluralities of sensors measure current lateral and longitudinal accelerations and wind vector, and wherein the first computer system is configured to automatically calculate and display a prediction of future lateral and longitudinal runway track and predictions of future lateral and longitudinal accelerations.

2. The apparatus of claim 1, wherein the first computer system is configured to automatically adjust aircraft controls based on the prediction.

3. A total runway safety system (TRSS) apparatus comprising:
a first plurality of sensors located on an aircraft that measure a first set of parameters regarding real-time spatial distribution of runway surface conditions relevant to a landing;
a first computer system communicatively coupled to the first plurality of sensors and to a second plurality of sensors spatially separated from the aircraft that measure a second set of parameters relevant to the landing, wherein the first computer system is configured to elicit and receive the first and second sets of parameters from the first and second plurality of sensors, and
wherein the first computer system is configured to automatically calculate a prediction of whether the landing can be done within safety parameters without overrunning runway longitudinally or veering off runway laterally and to output indications of the prediction to flight crew in the aircraft; and
an imaging system that generates fast digital optical and infrared thermal images (side, down and forward) during day and night operations, wherein the first computer system makes continuous and updated estimates of runway spatially-distributed rolling and braking coefficients of friction based on processing of the fast digital optical and infrared thermal images.

4. The apparatus of claim 3, wherein the first computer system is configured to automatically adjust aircraft controls based on the prediction.

5. A total runway safety system (TRSS) apparatus comprising:
a first plurality of sensors located on an aircraft that measure a first set of parameters regarding real-time spatial distribution of runway surface conditions relevant to a landing;
a first computer system communicatively coupled to the first plurality of sensors and to a second plurality of sensors spatially separated from the aircraft that measure a second set of parameters relevant to the landing, wherein the first computer system is configured to elicit and receive the first and second sets of parameters from the first and second plurality of sensors, and
wherein the first computer system is configured to automatically calculate a prediction of whether the landing can be done within safety parameters without overrunning runway longitudinally or veering off runway laterally and to output indications of the prediction to flight crew in the aircraft; and
a system that generates infrared laser beams and one or more microwave radiometers, wherein the first computer system uses received data from backscatter of the infrared laser beams and the microwave radiometers to independently evaluate groundspeed and spatially-distributed reflectivity, emissivity and temperature of the runway surface and also makes estimates of the runway surface conditions, roughness and contamination types and thicknesses that affect rolling and braking efforts and ultimately predicts lateral and longitudinal acceleration history.

6. A total runway safety system (TRSS) apparatus comprising:
a first plurality of sensors located on an aircraft that measure a first set of parameters regarding real-time spatial distribution of runway surface conditions relevant to a landing;
a first computer system communicatively coupled to the first plurality of sensors and to a second plurality of sensors spatially separated from the aircraft that measure a second set of parameters relevant to the landing, wherein the first computer system is configured to elicit and receive the first and second sets of parameters from the first and second plurality of sensors, and
wherein the first computer system is configured to automatically calculate a prediction of whether the landing can be done within safety parameters without overrunning runway longitudinally or veering off runway laterally and to output indications of the prediction to flight crew in the aircraft; and
infrared laser, optical and microwave radiometers, wherein the first computer system uses the infrared laser, optical and microwave radiometers to gain information about remaining runway length, current groundspeed, actual and predicted acceleration.

7. The apparatus of claim 6, wherein the first computer system is configured to automatically adjust aircraft controls based on the prediction.

8. A total runway safety system (TRSS) apparatus comprising:
a first plurality of sensors located on an aircraft that measure a first set of parameters regarding real-time spatial distribution of runway surface conditions relevant to a landing;
a first computer system communicatively coupled to the first plurality of sensors and to a second plurality of sensors spatially separated from the aircraft that measure a second set of parameters relevant to the landing, wherein the first computer system is configured to elicit and receive the first and second sets of parameters from the first and second plurality of sensors, and
wherein the first computer system is configured to automatically calculate a prediction of whether the landing can be done within safety parameters without overrunning runway longitudinally or veering off runway laterally and to output indications of the prediction to flight crew in the aircraft; and
digital visual and infrared cameras, wherein the first computer system receives image data from the digital visual and infrared cameras for evaluation of runway surface and estimates future accelerations based on the evaluated image data.

9. A total runway safety system (TRSS) apparatus comprising:
a first plurality of sensors located on an aircraft that measure a first set of parameters regarding real-time spatial distribution of runway surface conditions relevant to a landing;
a first computer system communicatively coupled to the first plurality of sensors and to a second plurality of sensors spatially separated from the aircraft that measure a second set of parameters relevant to the landing,
wherein the first computer system is configured to elicit and receive the first and second sets of parameters from the first and second plurality of sensors, and
wherein the first computer system is configured to automatically calculate a prediction of whether the landing can be done within safety parameters without overrunning runway longitudinally or veering off runway laterally and to output indications of the prediction to flight crew in the aircraft; and
a system that generates acoustic ultrasound data, wherein the first computer system receives the acoustic ultrasound data for evaluation of runway surface and estimates future accelerations based on the evaluated acoustic ultrasound data that is suitable for poor weather conditions.

10. A total runway safety system (TRSS) apparatus comprising:
a first plurality of sensors located on an aircraft that measure a first set of parameters regarding real-time spatial distribution of runway surface conditions relevant to a landing;
a first computer system communicatively coupled to the first plurality of sensors and to a second plurality of sensors spatially separated from the aircraft that measure a second set of parameters relevant to the landing,
wherein the first computer system is configured to elicit and receive the first and second sets of parameters from the first and second plurality of sensors,
wherein the first computer system is configured to automatically calculate a prediction of whether the landing can be done within safety parameters without overrunning runway longitudinally or veering off runway laterally and to output indications of the prediction to flight crew in the aircraft,
wherein the aircraft is a transport-category airplane certified under Federal Aviation Regulations part 25 (FAR 25), wherein the first computer system is connected to a plurality of TRSS multi-sensor units located in the aircraft including a multi-sensor unit in each landing-gear assembly of the aircraft, a multi-sensor unit located in a nose of the aircraft, and a multi-sensor unit located on a vertical tail location, and wherein, as landing gear are deployed for landing, the plurality of multi-sensor units are extended, and, after gear retraction, the multi-sensor units are disabled and no longer needed until next landing, in order that the multi-sensor units are protected during most of the flight time and not exposed to high dynamic pressures and damage risk due to debris.

11. The apparatus of claim 10, wherein at least one of the plurality of multi-sensor units is coupled to a retractable boom.

12. A total runway safety system (TRSS) apparatus comprising:
a first plurality of sensors located on an aircraft that measure a first set of parameters regarding real-time spatial distribution of runway surface conditions relevant to a landing;
a first computer system communicatively coupled to the first plurality of sensors and to a second plurality of sensors spatially separated from the aircraft that measure a second set of parameters relevant to the landing,
wherein the first computer system is configured to elicit and receive the first and second sets of parameters from the first and second plurality of sensors, and
wherein the first computer system is configured to automatically calculate a prediction of whether the landing can be done within safety parameters without overrunning runway longitudinally or veering off runway laterally and to output indications of the prediction to flight crew in the aircraft; and a plurality of side-looking and forward-looking ultrasonic transceivers, and wherein the first computer system receives information from the ultrasonic transceivers to reduce and minimize bird-strike hazards during landing and takeoff aircraft which are greatest at low altitudes.

13. A total runway safety system (TRSS) method comprising:

measuring a first set of parameters of real-time spatial distribution of runway surface conditions relevant to a landing using a first plurality of sensors located on an aircraft;

eliciting and receiving the first set of parameters from the first plurality of sensors into a first computer system located on the aircraft;

eliciting and receiving a second set of parameters into the first computer system from a second plurality of sensors that are spatially separated from the aircraft and that measure a second set of parameters of spatial distribution of runway surface conditions relevant to the landing;

automatically calculating, using the first computer system, a prediction of whether the landing can be done within safety parameters without overrunning runway longitudinally or veering off runway laterally;

outputting indications of the prediction to flight crew in the aircraft;

using the first plurality of sensors located on the aircraft, measuring a third set of parameters relevant to a takeoff;

eliciting and receiving the third set of parameters from the first plurality of sensors into the first computer system; and automatically calculating, by the first computer system, a prediction whether the takeoff can be done within safety parameters without overrunning runway longitudinally or veering off runway laterally and to automatically adjust aircraft controls based on the comparisons of the first and second sets of measured landing and takeoff parameters and conditions to predetermined values and combinations of values.

14. A total runway safety system (TRSS) method comprising:

measuring a first set of parameters of real-time spatial distribution of runway surface conditions relevant to a landing using a first plurality of sensors located on an aircraft;

eliciting and receiving the first set of parameters from the first plurality of sensors into a first computer system located on the aircraft;

eliciting and receiving a second set of parameters into the first computer system from a second plurality of sensors that are spatially separated from the aircraft and that measure a second set of parameters of spatial distribution of runway surface conditions relevant to the landing;

automatically calculating, using the first computer system, a prediction of whether the landing can be done within safety parameters without overrunning runway longitudinally or veering off runway laterally;

outputting indications of the prediction to flight crew in the aircraft;

using the first plurality of sensors located on the aircraft to measure a third set of parameters relevant to a takeoff;

eliciting and receiving the third set of parameters from the first plurality of sensors into the first computer system;

communicating between the first computer system and a remote computer system located off the aircraft, and eliciting and receiving pre-processed data from runway-based sensors representing real-time spatial distribution of runway surface conditions relevant to the takeoff from the remote computer system into the first computer system;

automatically calculating, by the first computer system, a prediction whether the takeoff can be done within safety parameters without overrunning runway longitudinally or veering off runway laterally; and outputting indications of the prediction to flight crew in the aircraft.

15. A total runway safety system (TRSS) method comprising:

measuring a first set of parameters of real-time spatial distribution of runway surface conditions relevant to a landing using a first plurality of sensors located on an aircraft;

eliciting and receiving the first set of parameters from the first plurality of sensors into a first computer system located on the aircraft;

eliciting and receiving a second set of parameters into the first computer system from a second plurality of sensors that are spatially separated from the aircraft and that measure a second set of parameters of spatial distribution of runway surface conditions relevant to the landing;

automatically calculating, using the first computer system, a prediction of whether the landing can be done within safety parameters without overrunning runway longitudinally or veering off runway laterally;

outputting indications of the prediction to flight crew in the aircraft; and using the first computer system to calculate takeoff and landing operational control and performance airspeeds based on atmospheric, environmental, weather, and runway conditions for the aircraft's mass and configuration.

16. A total runway safety system (TRSS) method comprising:

measuring a first set of parameters of real-time spatial distribution of runway surface conditions relevant to a landing using a first plurality of sensors located on an aircraft;

eliciting and receiving the first set of parameters from the first plurality of sensors into a first computer system located on the aircraft;

eliciting and receiving a second set of parameters into the first computer system from a second plurality of sensors that are spatially separated from the aircraft and that measure a second set of parameters of spatial distribution of runway surface conditions relevant to the landing;

automatically calculating, using the first computer system, a prediction of whether the landing can be done within safety parameters without overrunning runway longitudinally or veering off runway laterally;

outputting indications of the prediction to flight crew in the aircraft; and using the first computer system to continuously calculate real-time estimates of point-of-no-return and commit-to-land runway locations after which no aborted landing and go-around should be attempted for existing and actual runway geometry and layout.

17. A total runway safety system (TRSS) method comprising:
measuring a first set of parameters of real-time spatial distribution of runway surface conditions relevant to a landing using a first plurality of sensors located on an aircraft;
eliciting and receiving the first set of parameters from the first plurality of sensors into a first computer system located on the aircraft;
eliciting and receiving a second set of parameters into the first computer system from a second plurality of sensors that are spatially separated from the aircraft and that measure a second set of parameters of spatial distribution of runway surface conditions relevant to the landing;
automatically calculating, using the first computer system, a prediction of whether the landing can be done within safety parameters without overrunning runway longitudinally or veering off runway laterally;
outputting indications of the prediction to flight crew in the aircraft; and
outputting, from the first computer system to the flight crew, a range of airspeeds between VGO and VSTOP if the takeoff weight is less than maximum and V1 speed is maximum stopping speed and minimum go speed when OEI.

18. A total runway safety system (TRSS) method comprising:
measuring a first set of parameters of real-time spatial distribution of runway surface conditions relevant to a landing using a first plurality of sensors located on an aircraft;
eliciting and receiving the first set of parameters from the first plurality of sensors into a first computer system located on the aircraft;
eliciting and receiving a second set of parameters into the first computer system from a second plurality of sensors that are spatially separated from the aircraft and that measure a second set of parameters of spatial distribution of runway surface conditions relevant to the landing;
automatically calculating, using the first computer system, a prediction of whether the landing can be done within safety parameters without overrunning runway longitudinally or veering off runway laterally;
outputting indications of the prediction to flight crew in the aircraft;
receiving, into the first computer system, data from dedicated runway computers that continuously evaluate runway potential-energy capacity and the kinetic energy storage of the aircraft, performing, by the first computer system, energy calculations; and
issuing specific advisory information to flight crew based on the energy calculations.

19. A total runway safety system (TRSS) method comprising:
measuring a first set of parameters of real-time spatial distribution of runway surface conditions relevant to a landing using a first plurality of sensors located on an aircraft;
eliciting and receiving the first set of parameters from the first plurality of sensors into a first computer system located on the aircraft;
eliciting and receiving a second set of parameters into the first computer system from a second plurality of sensors that are spatially separated from the aircraft and that measure a second set of parameters of spatial distribution of runway surface conditions relevant to the landing;
automatically calculating, using the first computer system, a prediction of whether the landing can be done within safety parameters without overrunning runway longitudinally or veering off runway laterally;
outputting indications of the prediction to flight crew in the aircraft; and
receiving, into the first computer system, data from dedicated TRSS computers that use sophisticated estimators of future acceleration levels to assist flight crew in real-time regarding critical operational decisions.

20. A total runway safety system (TRSS) method comprising:
measuring a first set of parameters of real-time spatial distribution of runway surface conditions relevant to a landing using a first plurality of sensors located on an aircraft;
eliciting and receiving the first set of parameters from the first plurality of sensors into a first computer system located on the aircraft;
eliciting and receiving a second set of parameters into the first computer system from a second plurality of sensors that are spatially separated from the aircraft and that measure a second set of parameters of spatial distribution of runway surface conditions relevant to the landing;
automatically calculating, using the first computer system, a prediction of whether the landing can be done within safety parameters without overrunning runway longitudinally or veering off runway laterally;
outputting indications of the prediction to flight crew in the aircraft;
providing one or more anti-skid computer systems on the aircraft;
providing one or more brake computers on the aircraft;
using the one or more brake computers, continuously evaluating available braking energy (ABE) capacity based on existing state of brake wear and representative brake temperatures;
performing rejected takeoff (RTO), normal landing, and aborted landing (PNR) computations based on the ABE evaluation; and
monitoring, by the one or more brake computers, tire wear, temperature and pressure; and
exchanging information between the one or more brake computers and the one or more anti-skid computer systems.

* * * * *